US011451847B2

United States Patent
Kasal et al.

(10) Patent No.: US 11,451,847 B2
(45) Date of Patent: Sep. 20, 2022

(54) METHODS AND SYSTEMS FOR GENERATING PERSONALIZED DATA-STREAMING FOR A MULTIMEDIA PLAYBACK DEVICE

(71) Applicant: Samsung Electronics Co., Ltd., Suwon-si (KR)

(72) Inventors: Srinivas H Kasal, Noida (IN); Prashant Srivastava, Noida (IN); Sujit Kumar Sinha, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/318,384

(22) Filed: May 12, 2021

(65) Prior Publication Data

US 2022/0150560 A1 May 12, 2022

(30) Foreign Application Priority Data

Nov. 6, 2020 (IN) .............................. 202011048572

(51) Int. Cl.
H04N 21/266 (2011.01)
H04N 21/2662 (2011.01)
(Continued)

(52) U.S. Cl.
CPC ......... *H04N 21/2662* (2013.01); *H04N 21/24* (2013.01); *H04N 21/4532* (2013.01); *H04N 21/4662* (2013.01)

(58) Field of Classification Search
None
See application file for complete search history.

(56) References Cited

U.S. PATENT DOCUMENTS 8,694,666 B2 4/2014 Dixon
10,476,943 B2 11/2019 Chen et al.
(Continued)

FOREIGN PATENT DOCUMENTS

IN 201941007335 A 8/2020
KR 10-2019-0088380 A 7/2019
(Continued)

OTHER PUBLICATIONS

International Search Report dated Sep. 8, 2021, issued in International Patent Application No. PCT/KR2021/095042.
(Continued)

*Primary Examiner* — Jefferey F Harold
*Assistant Examiner* — Charles N Hicks
(74) *Attorney, Agent, or Firm* — Jefferson IP Law, LLP

(57) ABSTRACT

A method in a networking environment to generate personalized data-streaming for a multimedia playback device is provided. The method includes deploying an ABR based data-streaming logic as a base-model at a multimedia playback device, obtaining parameters for a time duration based on a multimedia-playback at the multimedia playback device, obtaining a statistical mean for the parameters based on a first statistical analysis, identifying a parameter from the parameters by comparing the obtained mean against a threshold weight associated with the parameters in accordance with the base model, scaling the identified parameter in a predefined format as training, applying a second statistical analysis to the identified parameter of the playback device and another playback device for determining a covariance between both devices and determining a category of the playback device based on the covariance and deploying a version of the trained base model upon the playback device based on the category.

27 Claims, 21 Drawing Sheets

(51) Int. Cl.
  *H04N 21/45*   (2011.01)
  *H04N 21/24*   (2011.01)
  *H04N 21/466*  (2011.01)

(56) References Cited

U.S. PATENT DOCUMENTS

| | | |
|---|---|---|
| 10,506,002 B2 | 12/2019 | Lou et al. |
| 10,681,395 B1 | 6/2020 | Gang et al. |
| 10,708,662 B1 | 7/2020 | Bourgoyne |
| 11,234,048 B2* | 1/2022 | Arpirez Vega ...... H04L 41/5067 |
| 2016/0335754 A1 | 11/2016 | Aaron et al. |
| 2017/0064352 A1 | 3/2017 | Xu et al. |
| 2018/0007443 A1 | 1/2018 | Cannistraro et al. |
| 2018/0240017 A1 | 8/2018 | Huszar et al. |
| 2020/0021826 A1 | 1/2020 | Mayrand |
| 2020/0228852 A1* | 7/2020 | Nielsen ............ H04N 21/23439 |
| 2020/0314497 A1* | 10/2020 | Zhan .................. H04N 21/2408 |
| 2020/0351504 A1 | 11/2020 | Sen et al. |
| 2021/0105517 A1 | 4/2021 | Cho et al. |
| 2021/0204011 A1* | 7/2021 | Jain ........................ H04L 43/08 |

FOREIGN PATENT DOCUMENTS

| | | |
|---|---|---|
| KR | 10-2019-0143072 A | 12/2019 |
| WO | 2020/067592 A1 | 4/2020 |
| WO | 2020/078575 A1 | 4/2020 |

OTHER PUBLICATIONS

Gairuboina et al., Indian Application No. 201941007335 A, The Patent Office Journal No. 35/2020 Dated Aug. 28, 2020.

\* cited by examiner

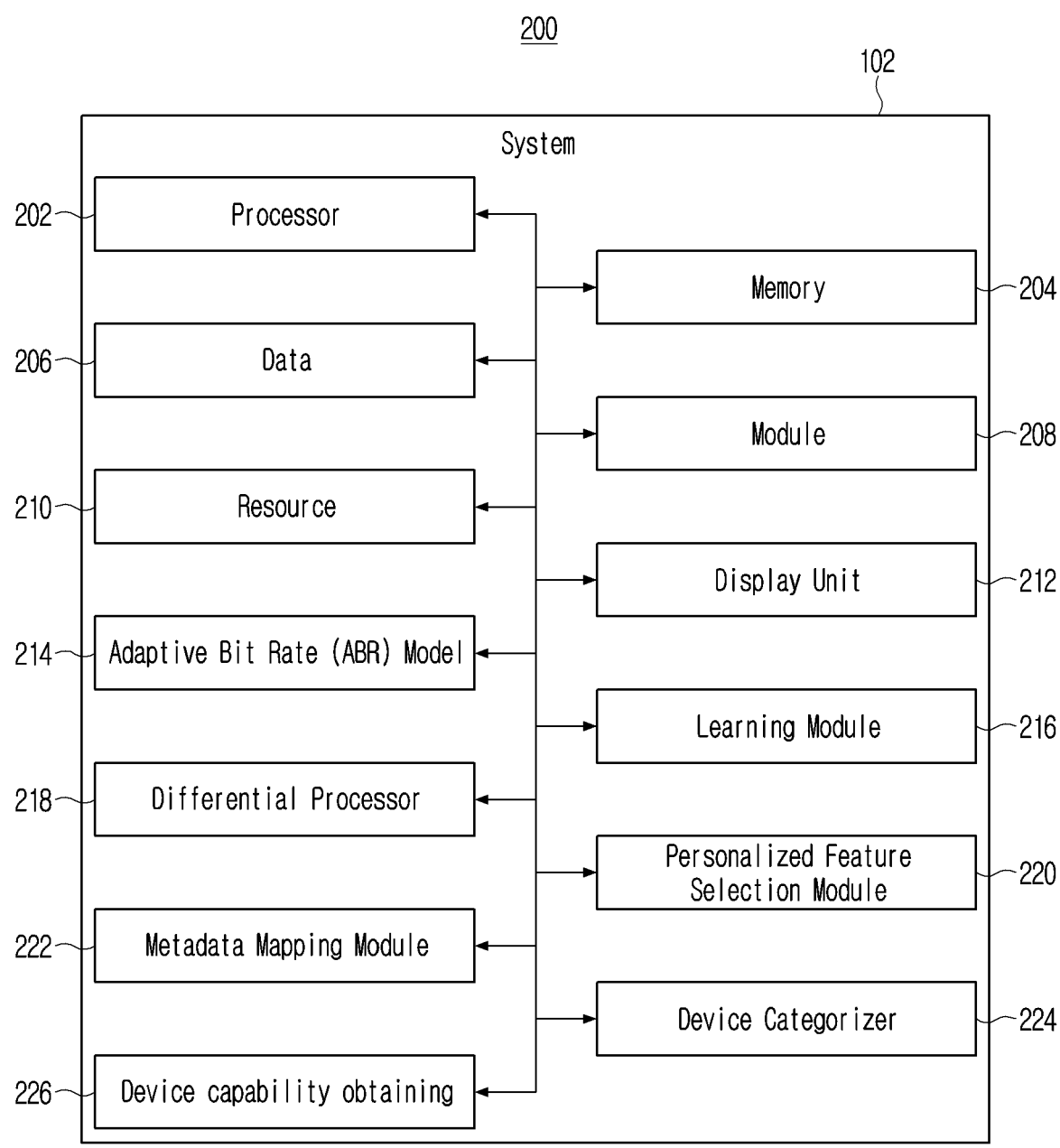

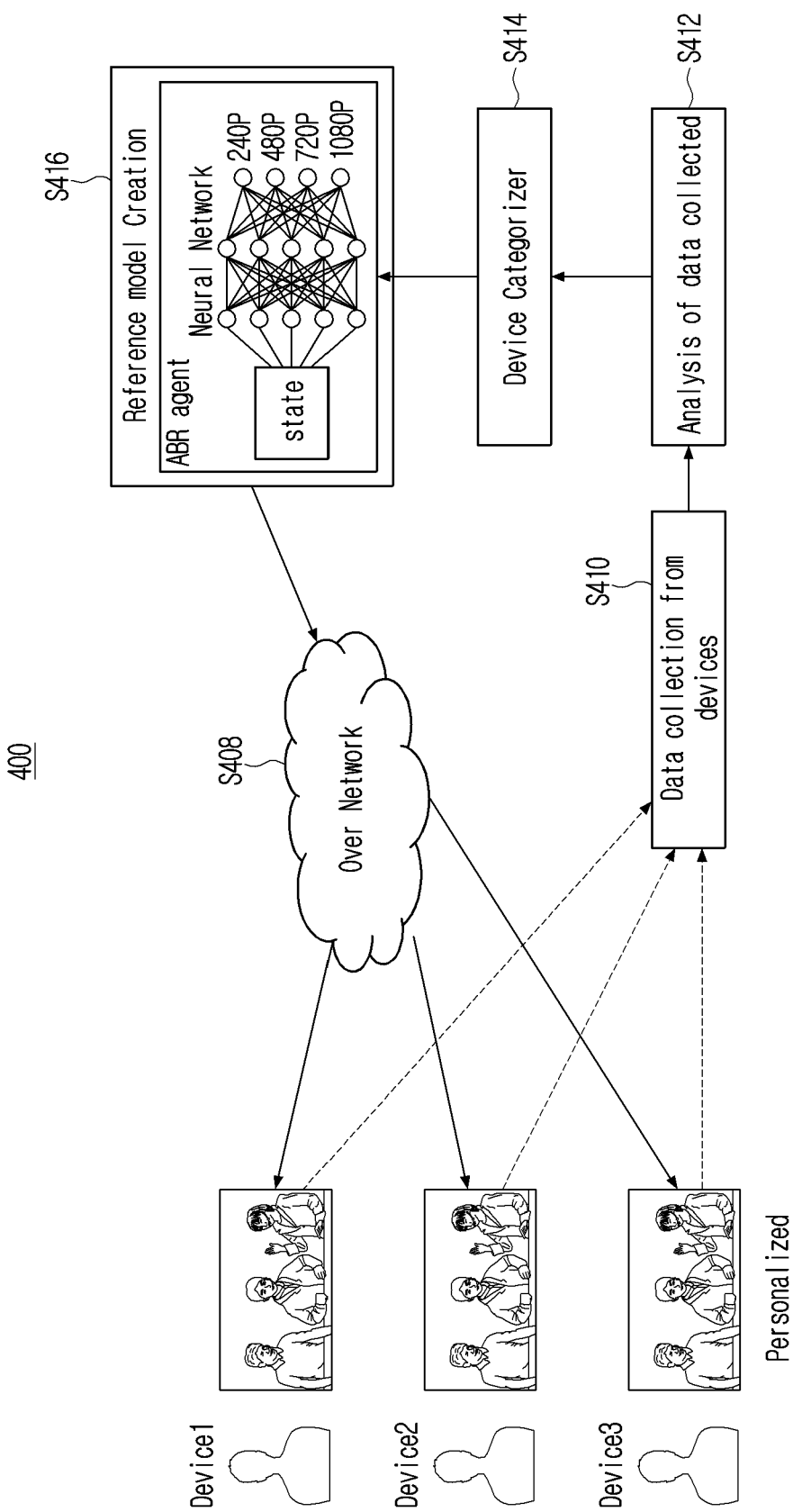

600

800b

Each Node to have Meta
- Last_CheckPoints
- Last_Penalties
- Hyper-Params
- Θ _OLD_PF
- Thresholds

FIG. 11
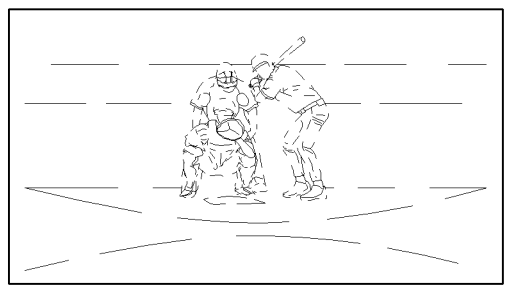
Scenario 1
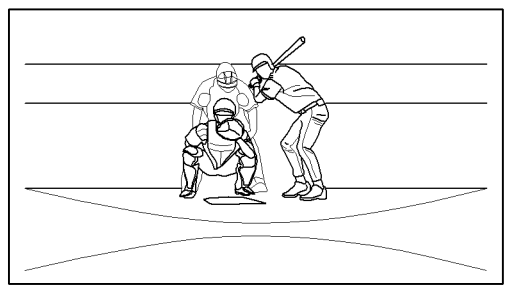
Scenario 2

METHODS AND SYSTEMS FOR GENERATING PERSONALIZED DATA-STREAMING FOR A MULTIMEDIA PLAYBACK DEVICE

CROSS-REFERENCE TO RELATED APPLICATION(S)

This application is based on and claims under 35 U.S.C. § 119(a) of an Indian patent application number 202011048572, filed on Nov. 6, 2020, in the Indian Intellectual Property, the disclosure of which is incorporated by reference herein in its entirety.

BACKGROUND

1. Field

The disclosure relates to data streaming More particularly, the disclosure relates to generating personalized data-streaming based on Machine Learning (ML).

2. Description of Related Art

With the ever-increasing diversity of display devices and video-resolutions and in the field of multimedia-content streaming, delivering high-quality videos to different devices over a wide range of the network is forever a challenge. The state of the art adaptive bit rate (ABR) criteria based streaming attempts to provide a solution by selecting a best-resolution video that provides high video quality playback for better user-experience, such selection being governed based on a given condition.

More specifically in adaptive streaming, same media contents are hosted with different resolutions, bitrates and in small segments or chunk sizes, so that, client can request any resolution, bitrate or segment duration, media, based on network conditions, playback device situation, etc. Quality of the video playback, depends on at which resolution and bitrate data is requested from server, higher the bitrate, higher the video quality, but this needs higher bandwidth.

Another mounting challenge is receipt of un-interrupted video during content streaming. In case of the state of the art adaptive bitrate streaming and while rendering high-resolution video at higher network bandwidth, if there is a sudden drop in network bandwidth for short period, the content playback freezes, as video buffer consumption is higher than filling these buffers.

At each segment, the boundary player at the receiving device needs to decide to request next video segment for playback, so making a more perfect or near-perfect decision at each stage will determine how best a system can provide high quality of experience (QoE) and without video freeze. Real-time playback of video, without a freeze, needs more suitable bitrate rate data and amount of buffer levels at the player side and compensates any jitter or dynamic variations in network bandwidth.

Recent developments include rule-based ABR mechanisms. As a part of client-server architecture, the server publishes the segment at various encoding bitrates and the client is informed of it in initial handshake. The content bitrate to be downloaded is decided on the client-side based on fixed rules, based on prevailing network heuristics or processing power, etc. The client initiates the download of the segment associated with the selected-bitrate. The selected segment is then downloaded on the client device, media processing is done, and finally rendered. The client-side protocol engine related to the ABR keeps track of network heuristics and buffer utilization after every segment downloads and appropriates it in decision making before the next segment download request.

However, rule-based ABR mechanisms exhibit poor responsiveness, as the same is based on "fixed rules" and accordingly does not perform well in fluctuating network-conditions. To name a few, the drawbacks include no real-time responsiveness towards varying real-time scenarios like network, media properties. There is a huge cost involved, even if slight modification is required, in ABR criteria related techniques. Last but not the least, the rule-based ABR is non-scalable to prioritize the different quality of experience QoE objectives such as higher bitrate, smoothness or re-buffering.

Further, recent developments include artificial intelligence (AI) based ABR mechanisms based on reinforcement learning (RL). The RL model is trained offline and installed on client device. The example training data include:
  Input: Worldwide network data
  Input: Synthetic data generate to simulate real time fluctuations
  Input: Simulated videos
  Output: QoE objective: less re-buffering, lesser bitrate switches, higher playback quality to thereby lead to smoothness during playback During the inference phase, the ABR protocol engine enquires about the next segment-bitrate to be downloaded. The selected segment is then downloaded on the client device, media processing is done, and finally rendered. As a part of other variants of ABR mechanisms, supervised learning is initially used for the first level of model creation. Thereafter, the RL is applied at the second stage to generate the model.

However, a client-based personalization is substantially less since a generic RL based ABR model is applied for all clients. For example, there is no client-based personalization based on certain important factors such as watching behavior, geographical conditions, media-type, media-genre etc. Accordingly, the state of the art AI based ABR mechanisms are all but susceptible to degeneration in unpredictable conditions such as an abrupt change in watching behavior, geographical conditions, media-type, media-genre etc.

Further, the state of the art AI based ABR mechanisms results in overall a very long cycle of training process which delays real-time decision making features. The same at least leads to a huge training effort since every training feature-set is not important for every geography/user. Alternatively, no intelligence is applied in feature-set selection. There is unwantedly often required complete re-training irrespective of varying performance in varying conditions (e.g. based on variation in users and geographical conditions).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for generating personalized data-streaming at a multimedia playback device.

Additional aspects will be set forth in part in the description which follows and, in part, will be apparent from the description, or may be learned by practice of the presented embodiments.

In accordance with an aspect of the disclosure, a method in a networking environment to generate personalized data-streaming for a multimedia playback device is provided. The method includes deploying an adaptive bit rate (ABR) based data-streaming logic as a base-model at a multimedia playback device of a user, obtaining one or more of parameters for a time duration based on a multimedia-playback at the multimedia playback device, the one or more parameters corresponding to a user-preference exhibited during the multimedia playback, obtaining a statistical mean for the one or more parameters based on a first statistical analysis, identifying at least one parameter from the one or more parameters based on comparing the obtained mean against a predefined threshold weight associated with the one or more parameters in accordance with the base model, scaling the at least one identified parameter in a predefined format as training data for training the base model, applying a second statistical analysis to the at least one identified parameter of the playback device and another playback device for determining a covariance between both playback devices and determining a category of the playback device based on the covariance, and deploying a version of the trained base model upon the playback device based on the category of the playback device.

In accordance with another aspect of the disclosure, a system for generating personalized data-streaming at a multimedia playback device is provided. The system includes an adaptive bit rate (ABR) based data-streaming logic deployed as a base-model, a learning module comprising a differential mean processor for obtaining one or more of parameters for a time duration based on a multimedia-playback at the multimedia playback device, the one or more parameters corresponding to a user-preference exhibited during the multimedia playback, and obtaining a statistical mean for the one or more parameter based on a first statistical analysis, a personalized feature selection module for identifying at least one parameter based on comparing the obtained mean against a predefined threshold weight associated with the one or more parameters in accordance with the base model, a metadata mapping module for scaling the at least one identified parameter in a predefined format as training data for training the base model, a device categorizer for applying a second statistical analysis to the at least one identified parameter of the playback device and another playback device for determining a covariance between both playback devices and determining a category of the playback device based on the covariance, and deploying a version of the trained base model upon the playback device based on the category of the playback device.

Other aspects, advantages and salient features of the disclosure will become apparent to those skilled in the art from the following detailed description, which taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a schematic block diagram of a system for generating personalized data-streaming at a multimedia playback device, according to an embodiment of the disclosure;

FIG. 4B illustrates a schematic block diagram depicting a process for deploying an Adaptive Bit Rate (ABR) based data-streaming logic as a base model at a multimedia playback device, according to an embodiment of the disclosure;

FIG. 11 illustrates a use case diagram depicting a process for generating a high-resolution video, according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the disclosure are described below in detail with reference to the accompanying drawings.

Figure 1A:
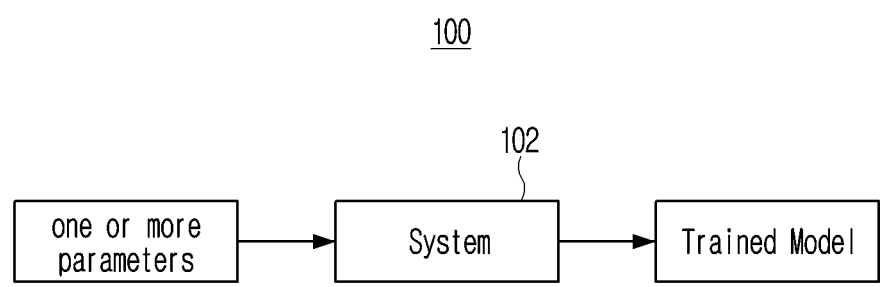
FIG. 1A illustrates an environment and operations for generating personalized data-streaming at a multimedia playback device, according to an embodiment of the disclosure.
Figure 1B:
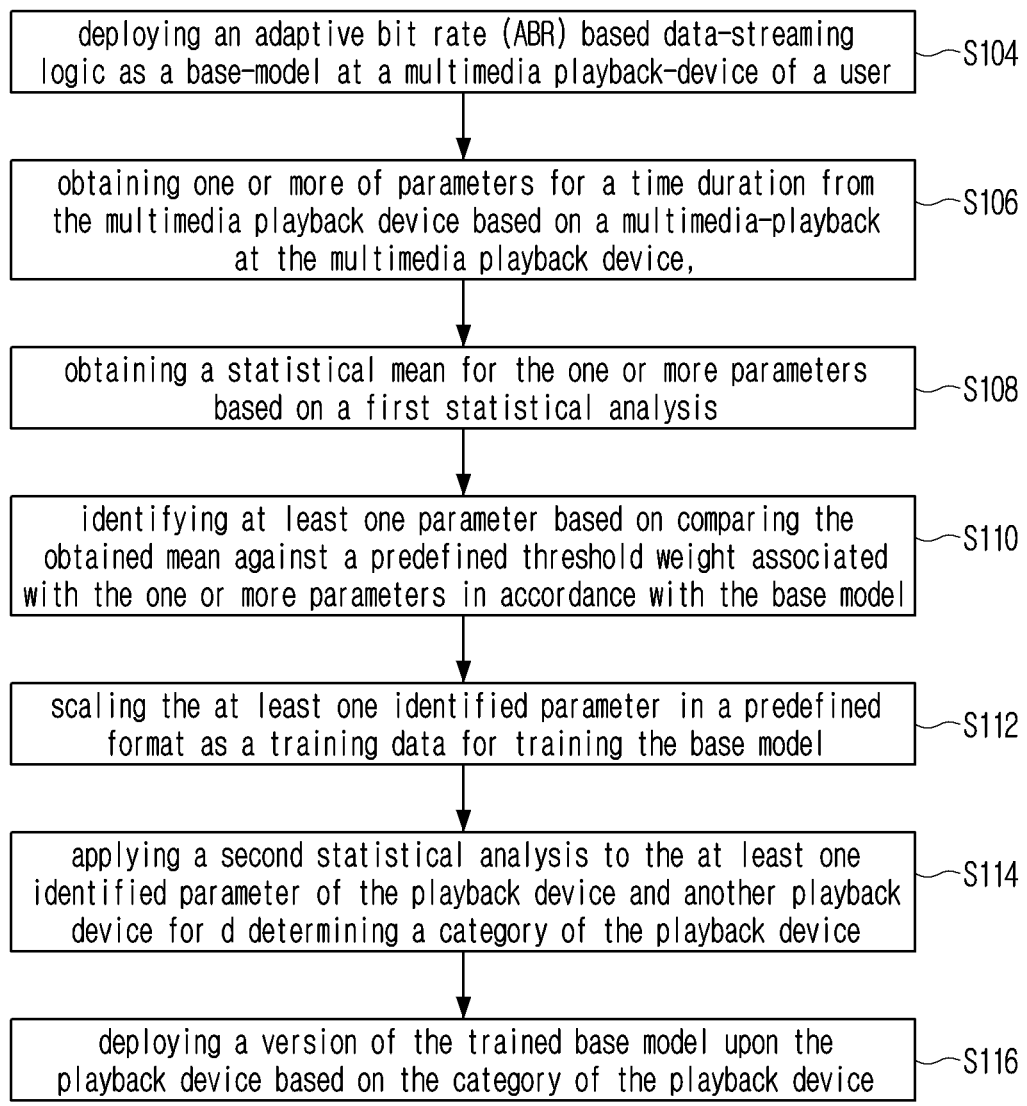
FIG. 1B illustrates an environment and operations for generating personalized data-streaming at a multimedia playback device, according to an embodiment of the disclosure.

FIGS. 1A and 1B illustrate a networking environment including a system for generating personalized data-streaming at a multimedia playback device and method operations performed by the system, according to various embodiments of the disclosure.

Referring to FIG. 1A, in a networking environment 100, a system 102 may be configured to generate the personalized data-streaming by simulating a content playback through an adaptive bit rate (ABR) model. In an embodiment, the generating personalized data-streaming may be defined as generating a data-stream for each of a number of multimedia playback devices such that personalized data-streaming may represent data-streaming for one of the multimedia playback devices. In an embodiment, the data-stream may be multimedia content and examples of the multimedia content may include but are not limited to audio, an image, a GIF, a video and the like. In an embodiment, generating personalized data-streaming may be followed by playing the personalized data-stream at the multimedia playback device. In an embodiment, system 102 may be configured to generate the personalized data-streaming based on one or more parameters associated with a user preference determined upon the personalized data-stream being played at the multimedia playback device. Example of the one or more parameters may include, but are not limited to, a video bitrate, a video resolution, a number of buffer sizes, a watching-behavior of a user, a genre, frames per second (fps), a buffer, and a resolution.

Referring to FIG. 1B, the system 102 may be configured to execute the method operations S104, S106, S108, S110, S112, S114 and S116.

At operation S104, the system 102 deploys a base-model at the multimedia playback device of the user. In an embodiment, the base model may be based on an ABR based data-streaming logic and the base model may interchangeably be referred as the ABR base model.

Subsequently, at operation S106, the system 102 may be configured to fetch the one or more parameters from the multimedia playback device based on the multi-media playback at the multimedia playback device. In an embodiment, the multimedia playback device may be queried/fetched for a time duration or a sampling duration (SD) from the multimedia content. In an embodiment, a user-preference exhibited during the multimedia playback at the multimedia playback device may be determined from the one or more parameters.

Continuing with the above embodiment and at operation S108, the system 102 may be configured to obtain a statistical mean for each of the one or more parameters upon fetching the one or more parameters. In an embodiment, the obtaining may be based on a first statistical analysis.

Subsequently, at operation S110, the system 102 may be configured to identify at least one parameter from the one or more parameters based on comparing the obtained mean for each of the one or more parameters against a predefined threshold weight associated with each of the one or more parameters in accordance with the base model.

Further, at operation S112, system 102 may be configured to scale the at-least one parameter identified from the one or more parameters in a predefined format as training data for training the base model.

Upon scaling the at-least one parameter, the system 102 at operation S114 may be configured to apply a second statistical analysis to the at-least one parameter of the multimedia playback device and another multimedia playback device for determining a covariance between the multimedia playback device and the other multimedia playback device.

Further, the system 102 at operation S114 may be configured to determine a category of the playback device based on the covariance. In an embodiment, the covariance may be determined based on a real number value corresponding to the at-least one parameter with respect to the multimedia playback device and the other multimedia playback device.

Further, the system 102 at operation S116 may be configured for deploying a version of the trained base model upon the playback device based on a category of the playback device.

FIG. 2 illustrates a schematic block diagram of the system for generating personalized data-streaming for installing at a multimedia-playback device, according to an embodiment of the disclosure. In an embodiment, the personalized data-streaming may be generated based on an adaptive bit rate (ABR) model for playing at the multimedia playback device. In an embodiment, the multimedia playback device may be a device capable of playing the generated personalized data-stream streamed through the internet. Examples of the playback media device may include, but are not limited to a smart phone, a tab, a Personal Computer (PC), a laptop, a television or the like.

In an embodiment and as referred in FIG. 1A, the personalized data-streaming may be generated based on scaling at least one parameter from one or more parameters. In an embodiment, the at least one parameter may be identified from the one or more parameters based on a comparison performed by the system 102 between a statistical mean and a predefined threshold weight associated with one or more parameters. In an embodiment, the one or more parameters may be fetched from the multimedia playback at the multimedia playback device.

Referring to FIG. 2, in a block diagram 200, the system 102 includes a processor 202, a memory 204, data 206, module(s) 208, resources(s) 210, a display unit 212, an ABR model 214, a learning module 216, a differential mean processor 218, a Personalized Feature (PF) selection module 220, a metadata mapping module 222, a device categorizer 224 and a device capability obtaining module 226. The processor 202, the memory 204, the data 206, the module(s) 208, the resources(s) 210, the display unit 212, the ABR model 214, the learning module 216, the differential mean processor 218, the PF selection module 220, the metadata mapping module 222, the device categorizer 224 and the device capability obtaining module 226 may be communicatively coupled to one another.

At least one of the plurality of modules may be implemented through an AI model. A function associated with AI may be performed through the non-volatile memory, the volatile memory, and the processor.

The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Being provided through learning means that, by applying a learning technique to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

According to the present subject matter, an electronic device implements a method for generating a personalized data stream and an operation thereof may be based on computer vision. In an implementation, the device may output data recognizing an image which in an example may be an image label for classifying the image. The image classification or the image label may be outputted by using image data as input data for an artificial intelligence model. The artificial intelligence model may be obtained by training. Here, "obtained by training" means that a predefined operation rule or artificial intelligence model configured to perform the desired feature (or purpose) is obtained by training a basic artificial intelligence model with multiple pieces of training data by a training technique. The artificial intelligence model may include a plurality of neural network layers. Each of the plurality of neural network layers includes a plurality of weight values and performs neural network computation by computation between a result of computation by a previous layer and the plurality of weight values.

Visual understanding is a technique for recognizing and processing things in a manner of human vision and includes, e.g., object recognition, object tracking, image retrieval, human recognition, scene recognition, 3D reconstruction/localization, or image enhancement.

As would be appreciated, the system 102, may be understood as one or more of a hardware, a logic, a configurable hardware, and the like. In an example, the processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data stored in the memory 204.

In an example, the memory 204 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 204 may include the data 206.

The data 206 serves, amongst other things, as a repository for storing data processed, received, and generated by one or more of the processor 202, the module(s) 208, the resources(s) 210, the ABR model 214, the learning module 216, the differential mean processor 218, the PF selection module 220, the metadata mapping module 222, and the device categorizer 224.

The module(s) 208, amongst other things, may include routines, programs, objects, components, data, etc., which perform particular tasks or implements data types. The module(s) 208 may also be implemented as, signal processor(s), state machine(s), logic circuitries, and/or any other device or component that manipulate signals based on operational instructions.

Further, the module(s) 208 may be implemented in hardware, instructions executed by at least one processing unit, for e.g., processor 202, or by a combination thereof. The processing unit may be a general-purpose processor that executes instructions to cause the general-purpose processor to perform operations or, the processing unit may be dedicated to performing the required functions. In another aspect of the present disclosure, the module(s) 208 may be machine-readable instructions (software) which, when executed by a processor/processing unit, may perform any of the described functionalities.

In some example embodiments, the module(s) 208 may be machine-readable instructions (software) which, when executed by a processor/processing unit, perform any of the described functionalities.

The resource(s) 210 may be physical and/or virtual components of the system 102 that provide inherent capabilities and/or contribute towards the performance of the system 102. Examples of the resource(s) 210 may include, but are not limited to, a memory (e.g., the memory 204), a power unit (e.g. a battery), a display unit (e.g., the display unit 212) etc. The resource(s) 210 may include a power unit/battery unit, a network unit, etc., in addition to the processor 202, and the memory 204.

The display unit 212 may display various types of information (for example, media contents, multimedia data, text data, etc.). The display unit 212 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

According to an example embodiment of the present subject matter, the learning module 216 may be configured to train an adaptive bit rate (ABR) based data-streaming model 214 deployed as a base-model. In an embodiment, the learning module 216 may be configured to train the base model based on the at-least one parameter identified from the one or more parameters and deploy a version of the trained base model upon the multimedia playback device based on a category of the multimedia playback device in accordance with the operation S104.

In an embodiment, the learning module 216 enables a network node (i.e. a cloud server or a remote server) to deploy the ABR model 214 as the base model at the multimedia playback device. In an embodiment, the network node may be configured to select the network traces from synthetic data, open network and historical data, the network traces comprising one or more of type of network used during simulated playback, duration of a media segment, start time of the media content playback, and end time of the media content playback.

In an embodiment, the network node may be configured to simulate content-playback based on network traces and at-least one standard adaptive bitrate (ABR) logic. Further, the network node may be configured to log a number of states associated with the simulated content playback. Subsequently, the network node may generate the base model based on training through a reinforcement machine learning (ML) based criteria using the number of states. In an embodiment, the number of states may be defined as one or more of a buffer size, time taken to download a past chunk of media, throughput associated with the past chunk of media, a bitrate associated with the past chunk of media, an incoming chunk size, and a remaining number of chunks for download.

In an embodiment, the reinforcement ML criteria may be directed to a bitrate selection for maximizing quality of experience (QoE) as a reward. Further, the network node may be configured to deploy the base model to the media playback devices along with version and meta-data.

Further, post deployment of the base model at the playback device, the differential mean processor 218 may be configured to obtain one or more parameters for a time duration from the multimedia playback device in accordance with operation S106. In an embodiment, the one or more parameters may be captured based on a multimedia-playback at the multimedia playback device. In an embodiment, one or more parameters may further denote a user-preference exhibited during the multimedia playback.

Further, the differential mean processor 218 may be configured to obtain a statistical mean for each of the one or more parameters based on a first statistical analysis in accordance with the operation S108. In an embodiment, the differential mean processor 218 may be configured to receive a number of values for the time duration corresponding to a User-Preference (PF) defining the one or more parameters. In an embodiment, the differential mean processor 218 may be configured to output a regressed average value of the PF based on linear regression of the number of the values. In an embodiment, the regressed average value may denote the obtained mean for the PF.

Continuing with the above embodiment, the personalized feature selection module 220 may be configured to execute operation S110 and identify one or more parameters based on comparing the obtained mean against a predefined threshold weight associated with the parameter in accordance with the base model or a latest updated model for the device. In an embodiment, the personalized feature selection module 220 may be configured to compare the regressed mean for the one or more parameters with the predefined threshold weight for the one or more parameter. In an embodiment, the predefined threshold weight for the one or more parameter forming a part of metadata associated with the ABR model deployed at the playback device as the base model. Further, the personalized feature selection module 220 may be configured to select one or more parameters based on a distance between the regressed mean and the predefined threshold weight corresponding to a predetermined range.

Subsequently, a PF matrix 504 (as depicted in diagram representation of FIG. 7) may be configured to associate the identified parameters associated with a number of real-number values. In an embodiment, the real-number values may correspond to a randomized value set indicative of the preference of the user during the multimedia playback.

Furthermore, a metadata mapping module 222 may be configured to execute operation S112 by scaling the one or more identified parameters in a predefined format as training data for training the base model. In an embodiment, the metadata mapping module 222 may be configured to access metadata associated with the deployed base model at the playback device. Further, the metadata mapping module 222 may be configured to update the metadata with one or more of the computed mean for each of the identified parameters, and the values of the real number accorded to each of the identified-parameter. Furthermore, the metadata mapping module 222 may be configured to associate the updated metadata with the base model for retraining the base model. In other example, the updated metadata may be associated with a latest updated model that may be an iteratively enhanced version or simply an updated version of the base model.

Continuing with the above embodiment, the device categorizer 224 may be configured to execute operation S114 and apply a second statistical analysis to each of the identified parameters of the multimedia playback device and another multimedia playback device for determining a covariance between both multimedia playback devices. Further, the device categorizer 224 may be configured to determine a category of the playback device based thereupon. Further, the device categorizer 224 may be configured to deploy a version of the trained base model upon the playback device based on a category of the playback device.

Further, in an embodiment, the device categorizer 224 may be configured to calculate the covariance between both multimedia playback devices. The device categorizer 224 may be configured to fetch, with respect to both of the multimedia playback devices, the real number values with respect to each of the identified parameters. With respect to each of the identified parameters, the device categorizer 224 may be configured to obtain a net value by subtracting the real number value from a corresponding mean of the real number values. Further, the device categorizer 224 may be configured to multiply the obtained net values for both the multimedia playback devices to obtain a product. Accordingly, the device categorizer 224 may be configured to determine the positive covariance with respect to each of the identified parameters based on a positive sign of the product.

To that understanding, the device capability obtaining module 226 (as also discussed in FIG. 10) may be configured to capture device capabilities based on a number of the parameters defined as one or more of an availability of support for a neural network based processing unit (NPU), historical usage of the NPU, storage availability, and power-utilization. Based on the device capabilities, it is determined whether the multimedia playback device is high-end or not. When it is determined that the multimedia playback device is not high-end, the process proceeds towards a server-side differential engine or server-side differential learning engine (DE) for generating the training data for personalizing the base model. When it is determined that the multimedia playback device is a high-end, the process includes appropriating the on-device DE to calculate a differential mean based on the parameter of device capabilities and thereby generating the training data for personalizing the base model.

More specifically, the device capability obtaining module 226 may be configured to sense a configuration of the multimedia playback device based on obtaining the device capability through the number of parameters and outputting a regressed-average value of the number of parameters based on linear regression of the number of the parameters.

Subsequently, the device capability obtaining module 226 may be configured to compare the regressed mean for the parameter with the predefined threshold weight for multimedia playback device. In an embodiment, the predefined threshold weight for the parameter may form a part of metadata associated with the ABR model deployed at the multimedia playback device as the base model.

Subsequently, the device capability obtaining module 226 may be configured to identify one or more parameters out of the number of parameters related to the capabilities of the device based on a distance between the regressed mean and the predefined threshold weight corresponding to a predetermined range. Accordingly, the device capability obtaining module 226 may be configured to associate the identified parameters associated with a plurality of real-number values, the real-number values corresponding to a randomized values set indicative of the capabilities of the playback device during the multimedia playback. Furthermore, the device capability obtaining module 226 may be configured to create a device-capability based training data for the base model by scaling the identified parameters with the associated real-number values and enabling the training of the base model along based on the device-capability based training data for deploying the trained base model on the category of the playback device.

Figure 3:
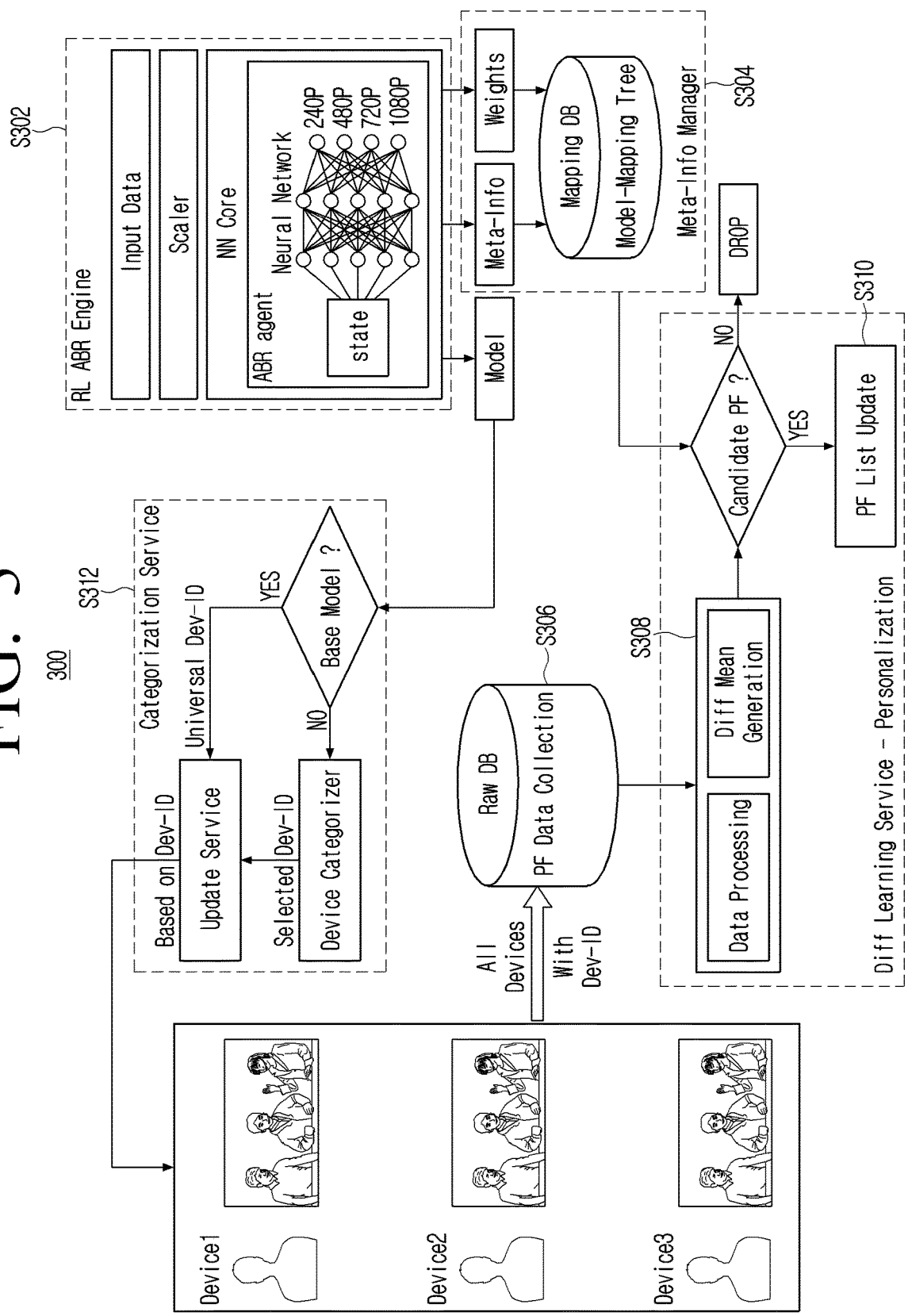
FIG. 3 illustrates an operational flow diagram depicting a process for generating personalized data-streaming at a multimedia playback device, according to an embodiment of the disclosure.

FIG. 3 illustrates an operational flow diagram depicting a process for personalizing the deployed ABR models at a multimedia playback device, according to an embodiment of the disclosure by the system 102 referred in the FIGS. 1A and 2. Accordingly, the personalized data streaming may be availed by the devices. In an embodiment, generating the personalized data-streaming may be based on an ABR logic based base model.

Referring to FIG. 3, in an operational flow diagram 300, at operation S302, the process includes creating a base reinforcement learning (RL) ABR model offline. In an embodiment, the RL ABR model may be created offline such that the historical data may include network traces from synthetic data, open network and historical data, the network traces comprising one or more of type of network used during simulated playback, duration of a media segment, start time of the media content playback, and end time of the media content playback.

As a part of operation S302, the process includes the deployment of the RL ABR model upon media devices (i.e. Device 1, Device 2, Device 3) subscribed for ABR logic. In an embodiment, the media devices may be referred to as a number of multimedia playback devices capable of multimedia playback. Examples of the multimedia playback devices may include but are not limited to a smart-phone, a tab, a Personal Computer (PC), a laptop, a television and the like.

At operation S304, the process includes storing metadata related to the RL ABR model and a model-version at the training-server. Specifically, the metadata and the model version may be mapped with one another in a mapping tree in the training server. In addition, as a part of operation S304, the process includes receiving a number of weights with a predetermined threshold value at the training server. Further, the process includes storing the weights in the mapping tree. The operations S302 and S304 correspond to the operation S104.

At operation S306 corresponding to operation S106, the process includes collecting Personalization Feature (PF)

data from the multimedia playback at the number of multimedia playback devices. In an embodiment, the process includes collecting a unique ID related to each of the numbers of the multimedia playback devices. The PF data may be associated with a PF of the number of multimedia playback devices defining one or more parameters. In an embodiment, the PF data may be collected for a time duration or a sampling duration (SD) from the multimedia playback.

At operation S308 corresponding to operation S108, the process includes calculating a differential learning mean corresponding to each of the PF data obtained at operation S306 upon expiry of the time duration at the server.

At operation S310 corresponding to the operation S110 and S112, the process includes comparing the new mean values corresponding to each of the PF data generated at operation S308 with a defined threshold for each PF. In an embodiment, a number of PF satisfying a criterion may be added as part of a PF list against a device ID. Based on the comparison, at least one PF and corresponding PF data are identified as candidates. Further, the identified PF data may be scaled to transform as training-data. In an embodiment, the personalized model is then created using at least one PF and metadata as collectively corresponding to the training data.

At operation S312 corresponding to the operation S114 and S116, the process includes performing device categorization of the at least one PF to identify devices which could be a candidate for the personalized model. Accordingly, the personalized model is deployed based on the device identifier (i.e. Device 1) of the devices. In the case of the model being a base model, the same is deployed based on a universal or a generic device identifier associated with the group of devices. The same has been further elaborated in FIG. 9.

At least based on the aforesaid, a two-stage AI model creation is achieved. The first stage corresponds to operation S302 and S304 wherein an AI reference model creation is done using a mix of different network conditions, streaming video parameters, buffer sizes, etc. The RL learning applied to the reference model is directed to Quality of Experience (QoE) as reward and re-buffering as a penalty. Other instance of penalty may include frequent bitrate changes.

Using the reference model on the playback device, a personalized model is created as the second stage, wherein the personalization is based on a particular device and playback specific parameters as training data to ensure the personalized model does best playback decision. The model may be additionally personalized based on device-specific capabilities: The second stage corresponds to operation S306 till S312.

Specifically as a part of the second stage, on each playback device a personalized AI model created using more suitable parameters for that particular device. This includes smart selection of different learning data, based on video playback nature on that device. A careful selection of different streaming video parameters, buffer variation nature, for that device ensures that AI model performs best with accurate prediction.

Figure 4A:
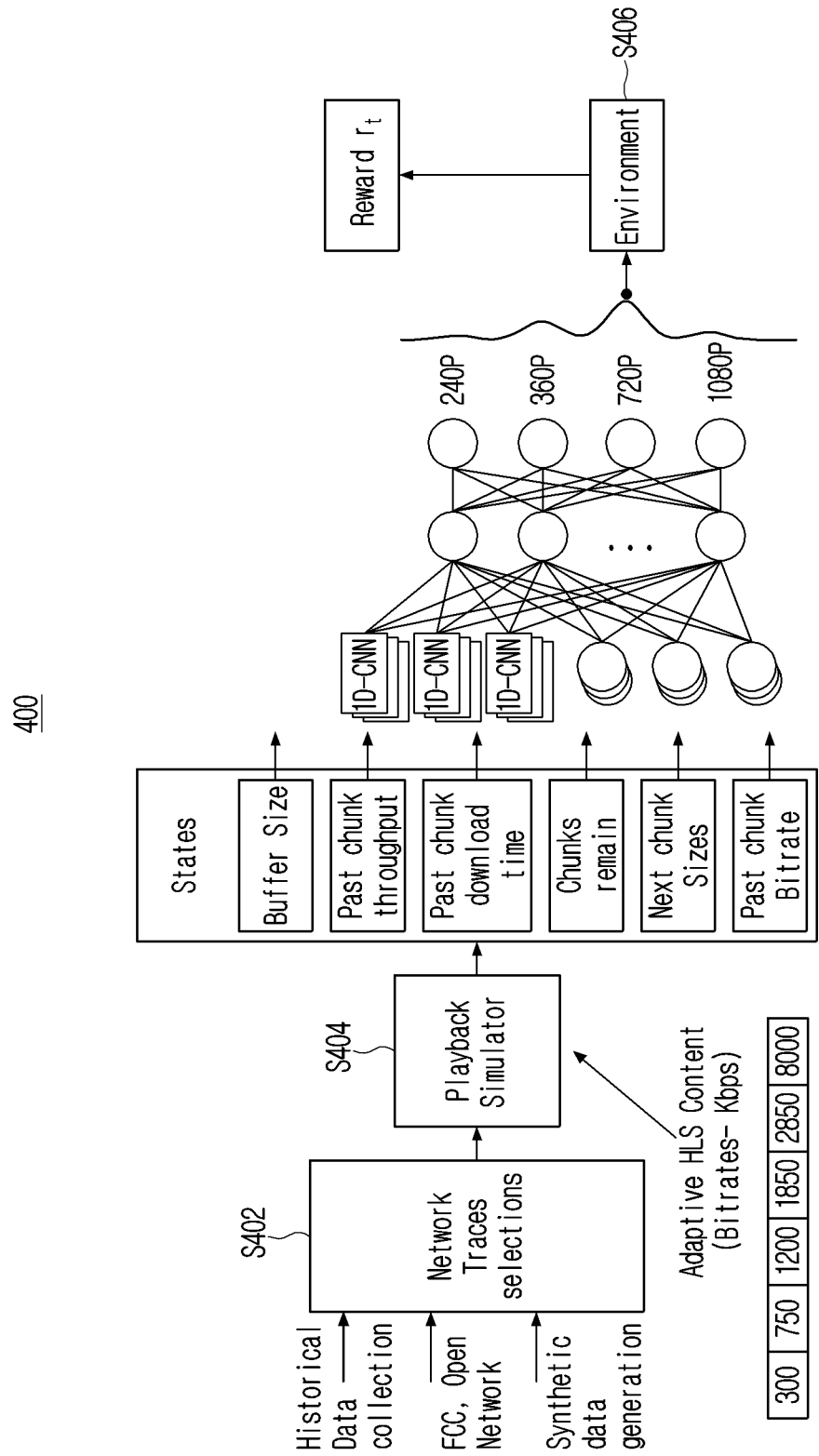
FIG. 4A illustrates a schematic block diagram depicting a process for deploying an Adaptive Bit Rate (ABR) based data-streaming logic as a base model at a multimedia playback device, according to an embodiment of the disclosure.

FIGS. 4A and 4B illustrate an operation flow diagram depicting a process for deploying personalized Adaptive Bit Rate (ABR) based data-streaming logic at a multimedia playback device, according to various embodiments of the disclosure. In an embodiment, the ABR base model may be referred as the base model, while the personalized ABR model may be referred as the personalized model. In an embodiment, development of the base model may include simulating a multimedia-playback based on network traces and at-least one standard adaptive bitrate (ABR) logic. In an embodiment, the process may include logging a number of states associated with the simulated content playback. In an embodiment, the process may include generating the base model based on training through a reinforcement machine learning (ML) based criteria using the plurality of states, the reinforcement ML criteria directed to a bitrate selection for maximizing quality of experience (QoE) as a reward. In an embodiment, the process may include deploying the base model at the media playback devices along with version and meta-data.

Referring to FIG. 4A, in an operation flow diagram 400, at operation S402, the process includes selecting a number of network traces from the multimedia playback at the multimedia playback device. In an embodiment, each of the number of network traces may be selected from synthetic data, FCC, an open network, and historical data associated with the multimedia playback and the multimedia playback device.

At operation S404, the process includes simulating the multimedia playback at the multimedia playback device. In an embodiment, the simulation may be based on the number of network traces selected at the operation S402, and at-least the standard ABR logic. In an embodiment, the process includes considering a number of bit-rates for simulation in combination with the number of network traces and at least one standard ABR logic. Further, the process includes logging the number of states related to the simulation of the multimedia playback at the multimedia playback device. Examples of the number of states may include, but are not limited to, a buffer size, a past chunk throughput, a past chunk download time, a number of chunk remains, a number of network chunk sizes and a past chunk bit rate and the like.

At operation S406, the process includes generating the base model based on training through the RL mechanism. In an embodiment, the RL based mechanism may utilize the number of states logged from the multimedia playback content simulated at the multimedia playback device. The initiation of training of the base model based on RL includes selecting a number of bitrates for generating the reward. In an embodiment, the reward may be directed to maximizing a quality of experience (QoE) corresponding to the multimedia playback.

Referring to FIG. 4B, at operation S408, upon having conducted the RL based training for generating the base model, the base model is deployed at the multimedia playback device. In an embodiment, deployment of the base model may be performed using cloud service. In an embodiment, the base model may further be deployed at the multimedia playback device for additional personalization based training of the base model. In an embodiment, a version and metadata with the base model deployed at the multimedia playback device is maintained at the server end in form of mapping tree.

The operations S402 till S408 correspond to operation S104 and collectively denote a reference model creation and deployment. The forthcoming operations S410 till S416 correspond to operations S106 till S114.

At operation S410, the process includes collecting one or more parameters from the media playback at the multimedia playback device. In an embodiment, the process includes collecting the one or more parameters from a number of multimedia playback devices. Examples of the one or more parameters may include, but are not limited to, a video bitrate, a video resolution, a number of buffer sizes, a watching-behavior of a user, a genre, frames per second (fps), a buffer, and a resolution. In an embodiment, the process further includes collecting a user preference associated with the one or more parameters based on a user watching nature. In an embodiment, the user watching nature may be derived from a type of personalized data-streamed as the media playback at the multimedia playback device. Upon collecting the one or more parameters the process may move towards analyzing the one or more parameters at operation S412.

At operation S412, the process includes analyzing the one or more parameters collected at the operation S410. In an embodiment, the analyzing may be performed for training decision associated with the base model. In an embodiment, the analyzing may be performed for training the base model based on the one or more parameters collected above. In an embodiment, the one or more parameters associated with the number of multimedia playback devices may be perceived as means to determine performance of the multimedia playback devices. In an embodiment, the process includes comparing a value of each of the one or more parameters with a predefined threshold value associated with the one or more parameters. In an embodiment, where it is determined that more than 50% of the multimedia playback devices perform below the predetermined threshold value, the process includes backtracking to operation S402 and augmenting the one or more parameters upon analyzing. Further, in an embodiment, where it is determined that more than 50% of the multimedia playback devices perform above the predetermined threshold value, the process includes moving forward to operation S414. In an embodiment, performance of the number of multimedia playback devices may be perceived as any of below or above the predetermined threshold value based on a comparison between the one or more parameters and the predetermined value corresponding to the number of multimedia playback devices. In an embodiment, the one or more parameters analyzed may be referred as analytics data interchangeably.

At operation S414, the process includes utilizing the analytics data for further generating input data. In an embodiment, utilizing may include filtering the analytics data for generating the input data. In an embodiment, the input data may include the updated analytics data and an augmented data set used for generating the simulation. Furthermore, the process includes generating training data for training the base model based on the updated analytics data and the augmented data set. Further, the process may move towards further training the base model.

At operation S416, the process includes performing a re-training of the base model on a reference model creation model server corresponding to operations S402 till S408. In an embodiment, the re-training of the base model may utilize the training data generated at the operation S414.

Figure 5:
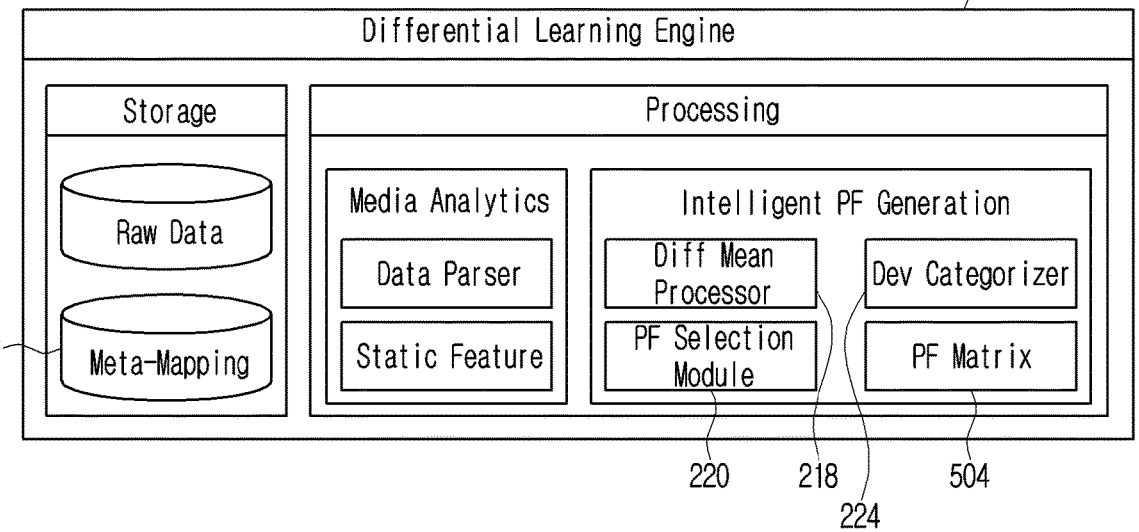
FIG. 5 illustrates a schematic block diagram of a differential learning engine for obtaining a statistical mean for one or more parameters obtained from the multimedia playback device based on a multimedia-playback, according to an embodiment of the disclosure.

FIG. 5 illustrates a schematic block diagram of an off-device or on-device differential learning engine (DE) accessible to the playback devices for executing the operations S106 till S114 of FIG. 1B.

Referring to FIG. 5, in a schematic block diagram 500, a DE 502 is configured for computing a statistical mean for one or more parameters obtained from the multimedia playback device based on a multimedia-playback, according to an embodiment of the disclosure. In an embodiment, the DE 502 may be configured to compute the statistical mean for a multimedia playback device 501. In an embodiment, computing the statistical mean may be based on a first statistical analysis of one or more parameters obtained from the multimedia playback device based on a multimedia-playback. Furthermore, the DE 502 may include the Differential Mean (DM) processor 218, the PF selection module 220, the meta-mapping database 222, and the device categorizer 224.

In an embodiment, the DM processor 218 may be referred as a processing module for processing a user-preference feature (PF) data. In an embodiment, the PF data may be parsed by a data parser. In an embodiment, the PF data may include a value corresponding to the PF. In an embodiment, the PF may define the one or more parameters. In an embodiment, the DM processor 218 may be configured to use each of the PF for the multimedia playback device as input and generate as an output a regressed average value of the corresponding to the each of the PF. In an embodiment, the DM processor 218 may be configured to generate a regressed average value for each of the PF corresponding to a number of multimedia playback devices.

Further, the PF selection module 220 may be configured to receive the regressed average value for each of the PF and determine if the PF may be a candidate PF for inclusion in a PF list. In an embodiment, each PF who's regressed average value is to be determined for inclusion in the PF list may be determined as the candidate PF.

In addition, a PF matrix 504 (as earlier referred in FIG. 2) forms a part of the DE 502. For each of the playback multimedia devices with a unique ID, this PF matrix 504 is calculated. Each row of this matrix determines candidate or identified PF and columns represent its values. The PF matrix is obtained based on a PF data associated with at least one multimedia playback device as further referred in FIG. 7.

Further, the meta-mapping module 222 may be a database. In an embodiment, the meta-mapping module 222 may be configured to be controlled for ensuring a quick and easy mapping of meta information associated with the base model with a model-version (MV) number. Along with mapping the meta information with the MV number, the meta-mapping module 222 may further be configured to manage weights associated with each of the PFs.

Further, the device categorizer 224 may be configured to categorize each of the number of multimedia playback devices based on a number of correlation values associated with each of the PFs associated with the multimedia playback devices. In an embodiment, the values of each of the PFs may be correlated with one another to determine the correlation value between the multimedia playback devices In an embodiment, if the correlation value between any of the number of multimedia playback devices is higher than a threshold value, the number of multimedia playback devices may be categorized with one another in a same group for generating a personalized data-stream.

Figure 6:
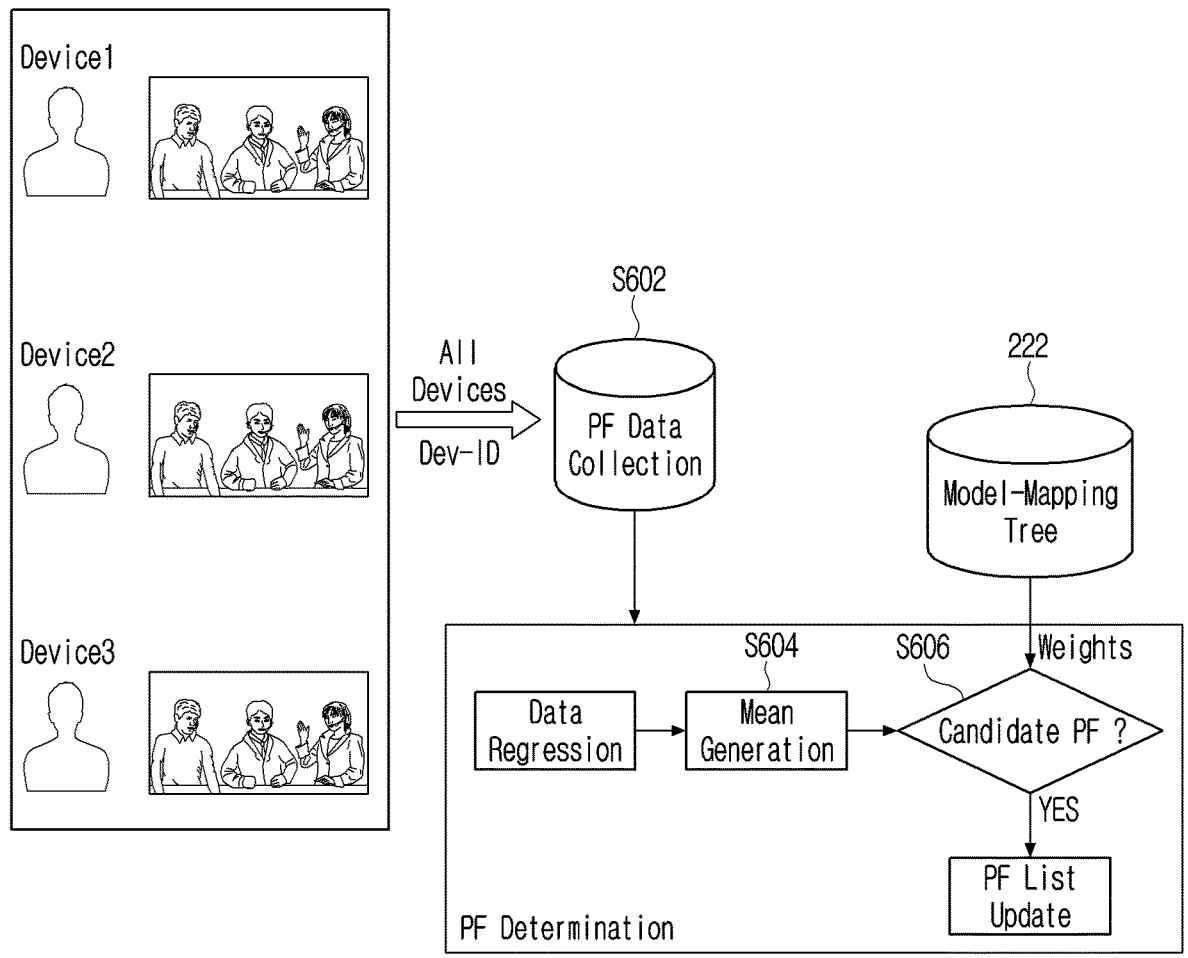
FIG. 6 illustrates an operational flow diagram depicting a process for determining a PF associated with a multimedia playback device, according to an embodiment of the disclosure.

FIG. 6 illustrates an operational flow diagram depicting a process for determining a PF associated with a multimedia playback device, according to an embodiment of the disclosure, and corresponds to the operation of the DM processor 218 and the PF selection module 220.

In an embodiment, the DM processor 218 may determine one or more parameters as PF data extracted from the multimedia playback at the multimedia playback device. A PF data corresponding to the PF may first be represented in the form of real-numbers. In an embodiment, the PF data may be labelled and associated with genre of the multimedia playback at the multimedia playback device. Further, the labelled PF data may be mapped to the real-numbers based on a watching hour during a sampling duration (SD). In an embodiment, the SD may be referred as duration of time for extracting the one or more parameters. In an embodiment, processing may start at expiry of the SD such that the SD may be pre-defined. In an embodiment, a SD experimental value may be 50 hours for a television.

Referring to FIG. 6, in an operational flow diagram 600, at operation S602, the process includes collecting the one or more parameters and a unique ID associated with at least one multimedia playback device for the PF determination.

At operation S604, the process includes determining a differential mean associated with the PF collected in operation S602. The differential mean may be determined as a weight associated with the PF. In an embodiment, a linear-regression may be applied over the one or more parameters referred herein as input data samples during the SD.

In an example, based on the input data samples [x1, x2, x2, . . . xn] over the SD, a weight may be generated as the differential mean as follows:

$$PF[X]=[x1,x2,x2,\ldots xn] \text{ over the SD} \qquad \text{Equation 1}$$

In an embodiment, the weight for the PF may be denoted as $\Theta new\_X$. Furthermore, an $\Theta old\_X$ for a given PF[X] may be an original weight received as output in the base model training and the $\Theta old\_X$ may be maintained in DB.

In an embodiment, a loss function earlier utilized in the base model may be utilized during the linear-regression for minimizing an error variability factor. In an embodiment, the $\Theta new\_X$ may be generated upon application and stabilization of the linear-regression. The process further includes defining Noise (N) for each PF associated with the number of multimedia playback devices. Further, the Noise (N) may be maintained in DB at the beginning. In an embodiment, the Noise (N) may be defined for inserting an amount of tolerance towards one or more parameters obtained during the SD and any noise inserted during the processing or any precision loss. In an embodiment, a distance between the $\Theta new\_X$ and the $\Theta old\_X$ may be referred as a Threshold (T). In an embodiment, the Threshold (T) may be determined experimentally. Further, the threshold (T) may be fine-tuned based on exhaustive experiments for varying multimedia playback devices. In an embodiment, for the television, 0.1 may be determined to be an experimental value initially.

At operation S606, a candidature of selected PF is determined based on a distance (d_X). The distance (d_X) may be calculated as follows:

$$d\_X=MOD(\Theta new\_X-\Theta old\_X)+N \qquad \text{Equation 2}$$

The candidature of selected PF is determined in case the determined distance d_X meets a threshold T. In such a scenario, the particular PF is added to the candidate list to be pursued as training data. Otherwise, the PF is rejected from consideration.

Figure 7:
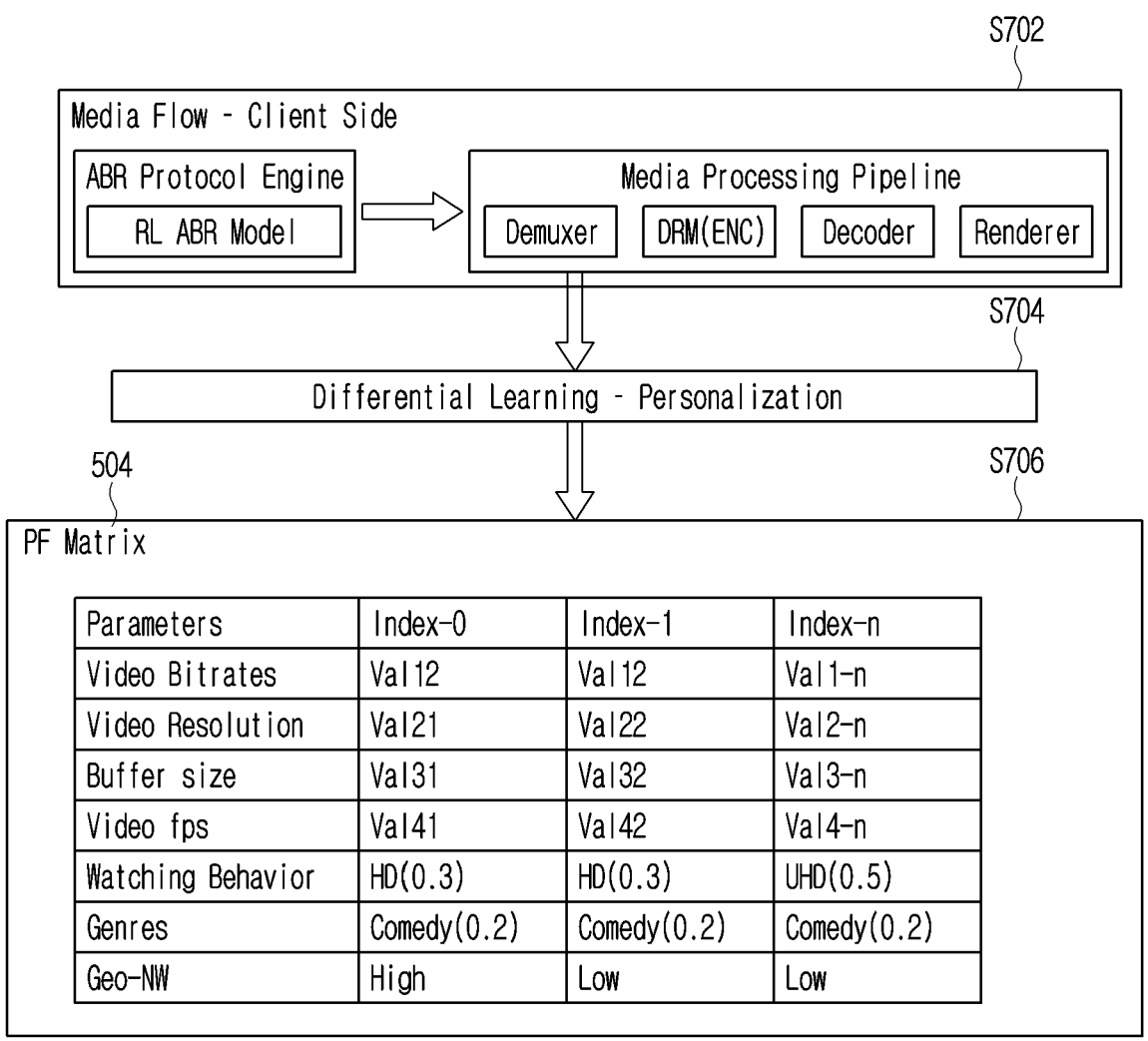
FIG. 7 illustrates an operational flow diagram depicting a process for generating a PF matrix, according to an embodiment of the disclosure.

FIG. 7 illustrates an operational flow diagram depicting a process for generating the PF matrix 504, according to an embodiment of the disclosure. In an embodiment, the PF matrix 504 may be generated for each of a number of multimedia playback devices.

In an embodiment, generating the PF matrix 504 may be based on utilizing one or more parameters extracted during the SD from a multimedia playback. In an embodiment, the PF matrix 504 may be generated as a generic structure in the form of a 2-Dimensional matrix. In an embodiment, the PF matrix 504 may be generated as the generic structure for better generalization and for defining a window for future additions or future deletions of the PF from the PF matrix.

In an embodiment, each row of the PF matrix 504 may determine a specific PF and each column of the PF matrix may represent values associated with each of the PF. In an embodiment, the values may be average/randomized values.

In an embodiment, where it is determined that the PF belongs to a classification type, the PF may include labelled values representing the PF in the form of real-numbers based on the SD.

In an embodiment, where the PF includes classifications such as comedy (0.2), sports (0.5), live-news (0.1) a base value of 1.0 may be assigned to the PF. Further, during the TD, for each occurrence of comedy (0.2), a previous value may be increased with a certain value (V) such that comedy (0.2)→V_1.0, sports (0.5)→V_2.0 such that the classification may have discrete values.

In an embodiment, the PF matrix 504 may contain information against the multimedia playback device. In an embodiment, the multimedia playback device may be denoted as D1. Further, against each of the multimedia playback devices "Dn", a 2D matrix may be associated. In an embodiment, a hashed compressed list using open-source library may be created such that the compressed list may be hashed by the ID associated with the multimedia playback device. In an embodiment, the hashed compressed list may be a PF list.

Referring to FIG. 7, in an operational flow diagram 700, at operation S702, the process includes receiving the identified PF from operation S606 of FIG. 6 at a media processing pipeline. Further, the media processing pipeline may include a demuxer, a DRM (ENC), a decoder, and a renderer.

At operation S704, the process includes personalization of the PF data based on differential learning.

At operation S706, the process includes generating the PF matrix 504 corresponding to the multimedia playback device.

Figure 8A:
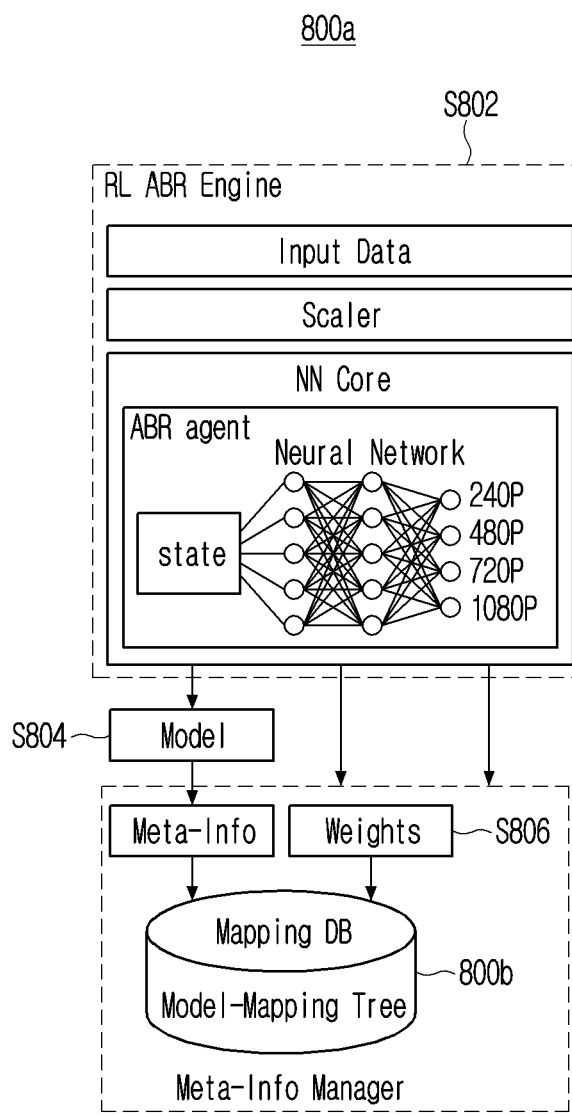
FIG. 8A illustrates an operational flow diagram depicting a process for meta-management, according to an embodiment of the disclosure.

FIG. 8A illustrates an operational flow diagram depicting a process for meta-management and corresponds to the operation S112 of FIG. 1B, according to an embodiment of the disclosure.

In an embodiment, training data and metadata utilized as training parameters for generating a base model and decision making for the categorization of a number of multimedia playback devices may be stored in a meta-mapping database. In an embodiment, a main database-module may store metadata information associated with a number of models. In an example embodiment, examples of the metadata information may include, but are not limited to, Last_Check-Points, Last_Penalties, $\Theta\_OLD\_PF$, Hyper-Params, thresholds along with a number of parameters associated with a PF matrix and a model version (MV) related to the PF. In an embodiment, the PF may define one or more parameters extracted from a multimedia playback at a multimedia playback device. In an embodiment, the PF may be utilized for training, scaling, and generating the base model. In an embodiment, the base model based on an ABR logic may be further trained for generating a personalized data-streaming for the multimedia playback device. In an embodiment, the meta-mapping module may be controlled by an algorithm for ensuring a quick and easy mapping of the meta-data information related to the base model with the MV number.

As continuing with above embodiment, upon creation of a complex PF list based on the one or more parameters as received from operation S606 in FIG. 6, the complex PF list may be scaled for being consistent as the training-data. In an embodiment, the details associated with the base model may be fetched from a model-mapping tree stored in the meta-mapping database against the MV number. In an embodiment, a number of operations may be associated with the meta-data related to the base model. Examples of the number of operations may include insertion and retrieval. In an embodiment, the number of operations may be performed in a quick manner in order to attain efficiency in terms of speed and space. Further in an embodiment, an advantage of storing the base models in a tree format may be performance improvement for a new model map updating in the mapping-tree and retrieval model for a number of multimedia playback devices. In an embodiment, a typical amortized cost of a search for x in tree, given a fixed node f may be:

$$\hat{c}_f(x) = O(\log(1+|x-f|))$$ Equation 3

Further, an almost similar-performance may be achieved for insertion.

Referring to FIG. 8A, an operational flow diagram 800, at operation S802, the method includes receiving the base model in accordance with respect to operations S402 to S408 of FIGS. 4A and 4B.

At operation S804, the method accessing metadata and weights information and a model mapping tree as later shown in FIG. 8B with respect to the base model.

At operation S806, the method includes scaling the complex and identified PF list (received from operation S606 of FIG. 6) for being consistent as the training-data and mapping the scaled form of the identified PF with the accessed nodes in the accessed mapping-tree in operation S804.

Accordingly, the retraining of the base model is conducted by the RL ABR engine based on the personalized training-data as obtained via operation S806 to obtain the personalized ABR model which corresponds to various model versions say V_1.0, V_2.0 as later depicted in Table 1 depicted as a part of description of FIG. 9.

Figure 8B:
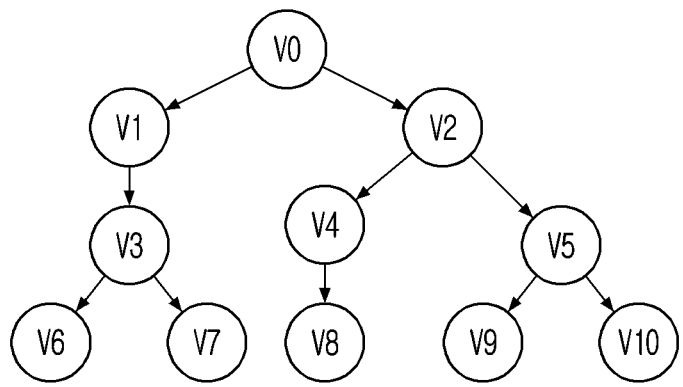
FIG. 8B illustrates a mapping tree, according to an embodiment of the disclosure.

FIG. 8B illustrates a mapping tree, according to an embodiment of the disclosure. In an embodiment, each node in the mapping tree may include the metadata such as Last_CheckPoints, Last_Penalties, Θ_OLD_PF, Hyper-Params, and thresholds.

Referring to FIG. 8B, a mapping tree 800b is illustrated.

Figure 9:
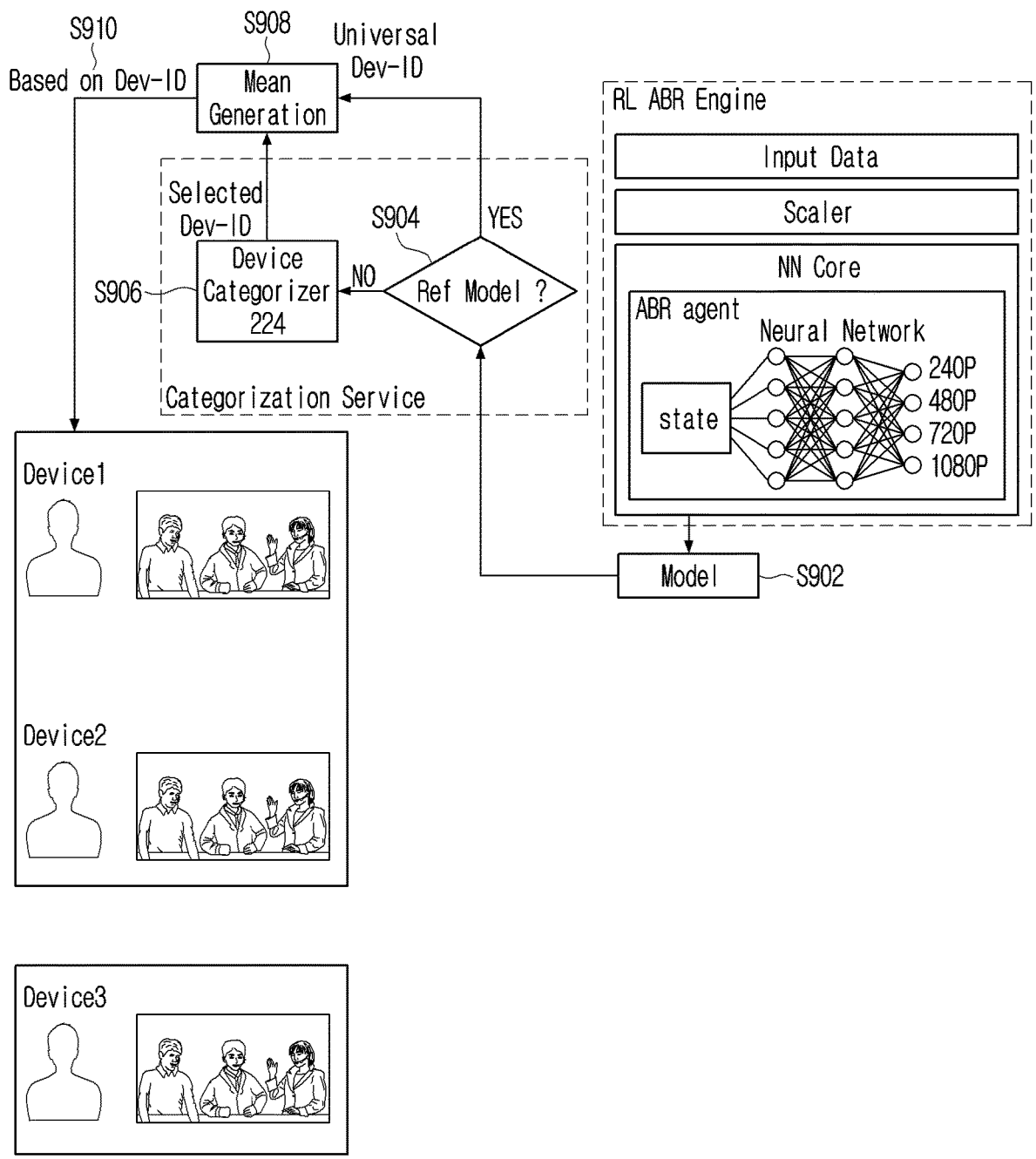
FIG. 9 illustrates an operational flow diagram for depicting a process for categorization of a number of multimedia playback devices, according to an embodiment of the disclosure.

FIG. 9 illustrates an operational flow diagram for depicting a process for the categorization of a number of multimedia playback devices in accordance with operations S112 and S114 of FIG. 1B and in accordance with the device categorizer 224.

In an embodiment, the device categorization may be performed based on a "Behavior Similarity (BSI)". In an embodiment, the BSI may be defined based on a number of operations. In an embodiment, a first operation amongst the number of operations may include comparing the number of multimedia playback devices. In an embodiment, the number of multimedia playback devices may be in an example denoted as D1 and D2. Further, the D1 and the D2 may be compared in terms of percent correlation with one another in order to determine if each PF in a PF matrix associated with the D1 and the D2 is common to a predetermined percentage. In an embodiment, the predetermined percentage maybe 50%. In an embodiment, the D1 and the D2 may be considered for the percent correlation based on the highest running average values associated with the D1 and the D2.

Continuing with the above embodiment, a second operation amongst the number of operations may include the D1 and the D2 with a percent correlation mapping between a Θ_NEW_PF for matchings a number of PFs in the PF matrix higher than a defined threshold. In an embodiment, Θ_NEW_PF may be a new weight associated with the PF. In an embodiment, an experimentally determined value may be 25%. Further, the experimentally determined value may be fine-tuned for heterogeneous multimedia playback devices.

$$Cov(x, y) = \frac{\sum_{i}^{N}(x_i - \bar{x})(y_i - \bar{y})}{N-1}$$ Equation 4

In an embodiment, Cov(x,y) may denote a covariance and the covariance may be calculated by considering a value associated with each of one or more parameters related to the multimedia playback devices. Further, a mean may be subtracted from the values to obtain net values and thereafter both the net values may be multiplied. In an embodiment, where it is determined that the values are above the mean (or below) or in other words both net values are positive, a result will be positive. Further, in an embodiment, the product will be negative, as either of the net values are in opposite directions.

In an embodiment, two categorizations are created in the following table:

TABLE 1

| Model Ver. | PF parameters | Devices |
|---|---|---|
| V_1.0 | Genre = Live-News, Bitrates = Mostly HD (7-9 Mbps) | D1 & D2 |
| V_2.0 | Genre = VoD-Comedy movie, Bitrates = Mostly U HD (12-14 Mbps), buffer = 10 sec to 20 sec | D3 |

Based on correlation mapping in the above Table 1, the candidate devices for personalized model version V 1.0 may be D1 and D2 as corresponding to the same category. The candidate device for personalized model version V 2.0 may be D3 as corresponding to the different categories.

Referring to FIG. 9, an operational flow diagram 900, the operation with respect to operation S114 may be depicted as a series of following operations S902 till S910.

In operation, at operation S902, the base model or the personalized model is received.

At operation S904, upon receipt of the model, it is checked if the received model is a personalized model as corresponding to V 1.0 or V 2.0.

At operation S906, the device categorizer 224 operates in case the received model is the personalized model. Based on the version of the model, the device category is chosen and accordingly a device identifier corresponding to the category is identified.

At operation S908, a universal device identifier is chosen in case the received model is the base model or the model based on the device categorization. In other example, the universal device identifier may be used to update the device(s) based on the base model, an iteratively enhanced/updated base model or any enhanced/updated base model that is related to a device category.

At operation S910, the base model or the personalized model is installed upon the devices based on the universal identifier or the chosen device identifier or, respectively.

Figure 10:
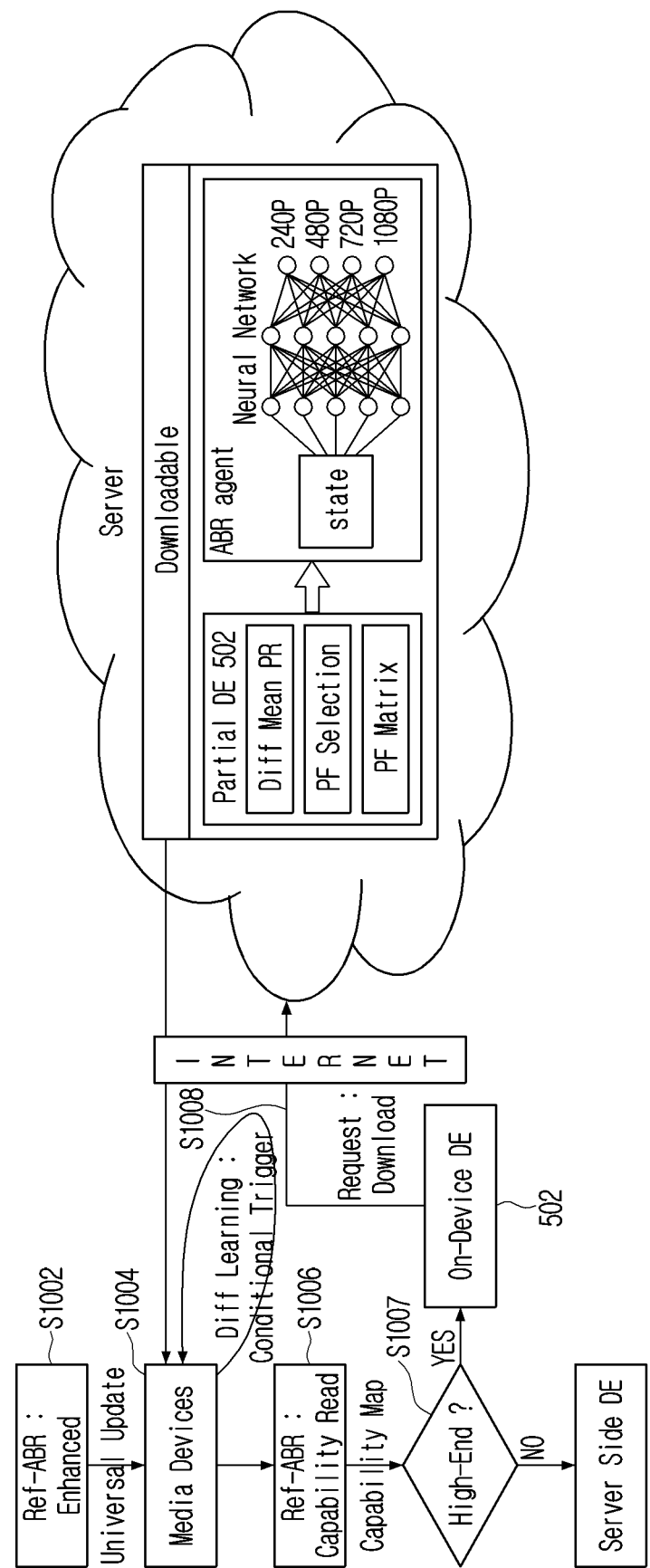
FIG. 10 illustrates a schematic block diagram of a high-end media device with neural processing unit (NPU) support and an operational flow diagram depicting a process for differential learning, according to an embodiment of the disclosure.

FIG. 10 illustrates an example embodiment depicting on-device Differential Learning Engine DE 502. In example, the playback device may be a high-end media device with NPU support, according to an embodiment of the disclosure. In an embodiment, the high-end media device may be a multimedia playback device. In an embodiment, the multimedia playback device may be amongst a number of multimedia playback devices and each of the number of multimedia playback devices may be heterogeneous devices. In an embodiment, each of the multimedia playback devices may include varying capabilities. In an embodiment, an ABR based base model may be configured to generate PF data associated with PF collected from multimedia playback. In an embodiment, the base model may be further configured to read the capabilities of the multimedia playback device through the device capability obtaining module 226.

In an embodiment, the capabilities readable by the base model may include any of a GNU/NPU support and GPU environment, CPU/GPU/NPU usage history, available storage, power utilization (for mobile devices), and a file system access level. Further, based on the capabilities, a device capability map may be presented to a decision module. In an embodiment, the decision module may include a predefined criterion (based on the capabilities of the multimedia playback devices) to consider the multimedia playback device as high-end or not. An example representation of the decision module may be as follows:

```
IF GPU_available == YES                         AND
   Storage_available > Threshold(8GB)           AND
   FS_access_level == YES                       AND
      GPU_usage_hist (last N days) < 50%        ......
         is_high_end = YES
         ELSE
         is_high_end = NO
```

A conditional trigger for downloading a personalized model through the on-device DE engine 502 may be raised based on a threshold QoE, which may be initially calculated based on historical data. The base model is later updated during the successful execution of differential learning cycles for personalization based on as follows:

$$QoE_T = \sum_{T=0}^{n} (\text{Smoothness} + \text{Rebufering}) \quad \text{Equation 5}$$

$$QoE_T < (QoE_{guaranteed}) \text{ AND } Device_{Policies}(\text{power, storage etc})$$

Referring to FIG. 10, in operation with respect to the on-device differential learning, at operation S1002, the process includes receiving a base model at the playback device as a part of a universal-update.

At operation S1004, a differential learning conditional trigger is raised for downloading the personalized model.

At operation S1006, the installed base model is configured to read the capability of the multimedia playback device through the device capability obtaining module 226 and thereby generates the device capability map.

At operation S1007, the process includes determining whether the multimedia playback device is high-end or not based on the capability-map. In an embodiment, where it is determined that the multimedia playback device is not high-end, the process proceeds towards a server-side differential engine for generating the training data for personalizing the base model. In an embodiment, where it is determined that the multimedia playback device is high-end, the process may proceed towards operation S1008.

At operation S1008, the process includes appropriating the on-device DE 502 to calculate a differential mean based on the parameter of device capabilities and thereby generating the training data. Thereafter, the off-device DE 502 or a server-side DE 502 is appropriated to generate the training data based on the PF as described in FIGS. 5 to 8B. Based thereupon, the base model is retrained based on the training data corresponding to device capability and the PF, and accordingly, the trained model is downloaded at the trained model based on device category via the mechanism of FIG. 9.

FIG. 11 illustrates an example working implementation depicting a process for generating a high-resolution video, according to an embodiment of the disclosure. With increasing bigger screen sizes, playback of video at highest resolution is important for best viewing quality, so that user feels great about return of investment (ROI). In an embodiment, with real-time training of most suitable training parameters, a personalized AI model in accordance with the disclosure provides assurance for selecting best highest video resolution for playback that provides better video quality on large video panel.

Scenario 1 renders a prior art scenario. Without personalized training data, adaptive streaming does not select highest video resolution and renders poor video quality on large video panel.

Scenario 1 renders a scenario in accordance with disclosure wherein through real-time training of most suitable training parameters, personalized AI model ensures selection of best highest video resolution for playback. High-end TVs with on-device Neural-Network processing engines, perform real time differential learning, based on user watching behavior and using matured trained base model from offline learning. By using matured base model, the on-device real-timing learning is reduced.

In an example, playback quality is enhanced by ~20%, re-buffering is reduced 10-30%, and buffer utilization is improved by 17% when compared with prior art/legacy ABR streaming for same network condition over.

In another example, the disclosure's personalized training solution exhibits real-time playback of video, without re-buffering. Whereas, the state of the art device exhibits a 9 sec re-buffering for same network condition.

In another example, the disclosure's personalized training solution playing at a higher bitrate (7127 kbps) exhibits 40 sec less re-buffering when compared to prior art solution (playing at 5430 kbps) for same network condition.

Figure 12:
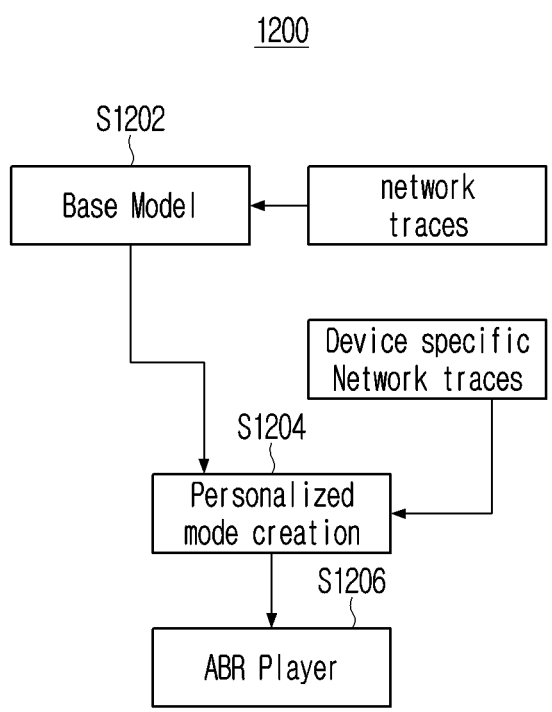
FIG. 12 illustrates a use case diagram depicting a process for a real-time playback to receive a latest update, according to an embodiment of the disclosure.

FIG. 12 illustrates an example diagram depicting a process for a real-time playback to receive a latest update, according to an embodiment of the disclosure. In an embodiment, personalized training data may assure real-time playback of a video without a freeze, in such a case, a user may receive the latest updates in real-time.

Referring to FIG. 12, in an example diagram 1200, at operation S1202, the process includes receiving a number of network traces at a base model. The base model is created by using a mix of different regions standard network traces, along with other adaptive streaming parameters.

At operation S1204, the process includes generating a personalized model based on the base model and device-specific network traces. Differential learning based personalized model is created using device-specific network traces and the selected PF. The personalized model now will have much better knowledge about network fluctuation, which helps in making smart decisions, so that there will be very minimal video freezing At operation S1206, the process includes ABR player receiving the personalized model for generating a personalized data-streaming.

Figure 13A:
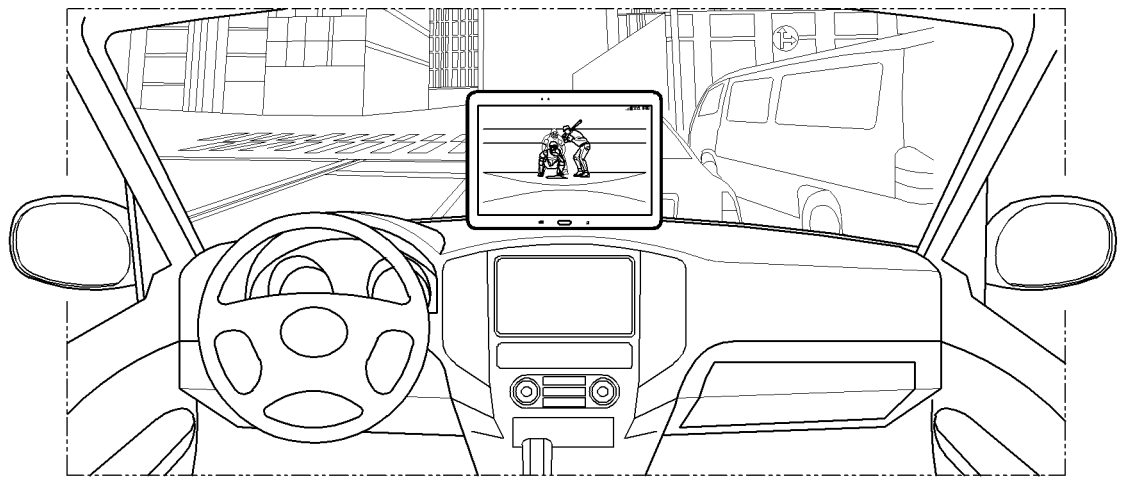
FIG. 13A illustrates a use case diagram depicting a process for watching a streaming video while in transit, according to an embodiment of the disclosure.
Figure 13B:
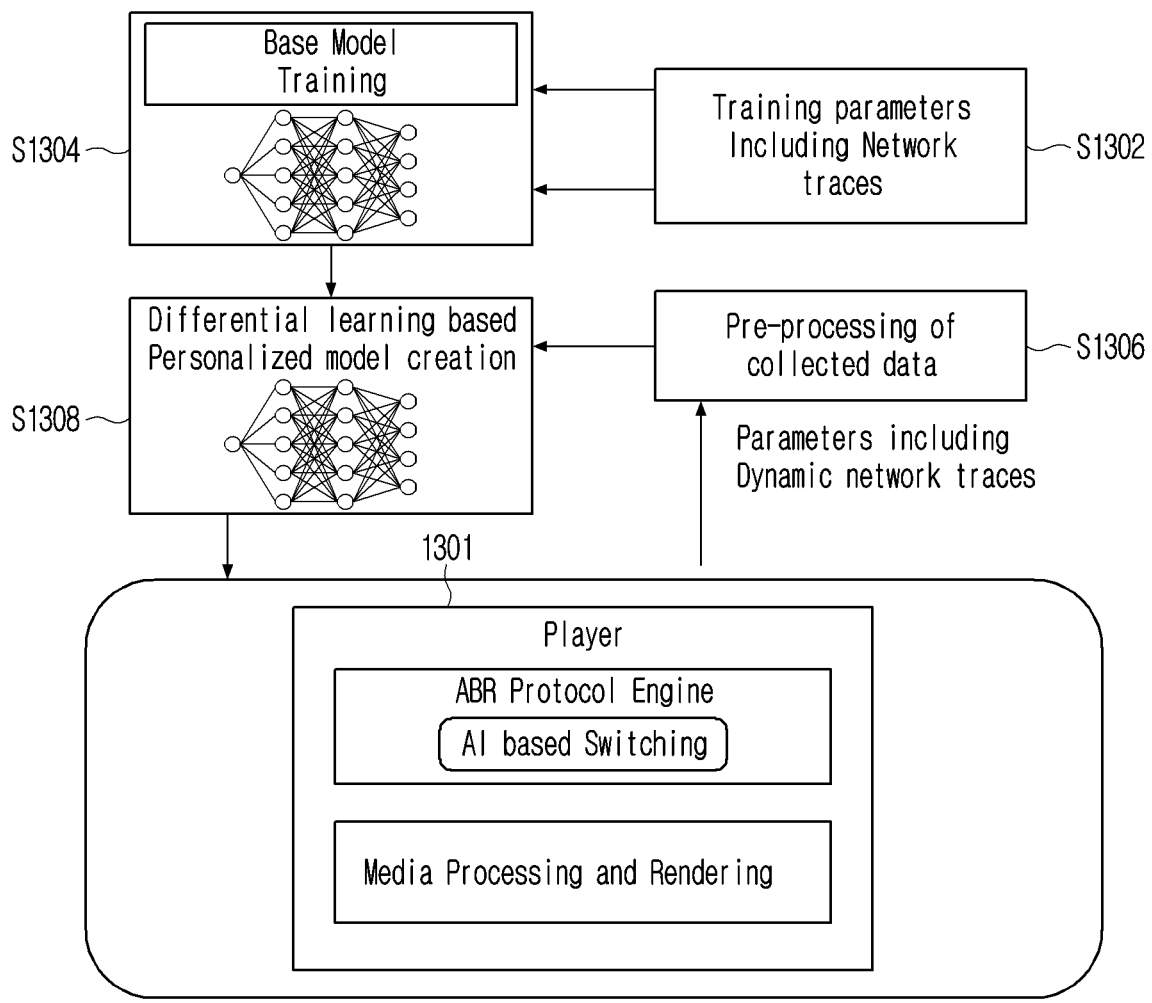
FIG. 13B illustrates a use case diagram depicting a process for watching a streaming video while in transit, according to an embodiment of the disclosure.

Without personalized training data due to incorrect bitrate selection, the Video playback freezes thereby resulting in lagged behind playback. In contrast, the disclosure's personalized training data facilitates real time playback of video without freeze, and allows a user to get latest updates in real-time. In an example, while watching important sports event, playback of the video without freeze ensure user will real time update/score in match FIGS. 13A and 13B illustrate a real-life scenario of user streaming video while in transit, according to various embodiments of the disclosure. A personalized, differential model takes a number of dynamic variations in network behavior on device, and a user's watching behavior pattern. Further, the personalized model undertakes adaptive bitrate selection for assuring a smooth video playback.

Referring to FIG. 13A, a real-life scenario is rendered. As user usually takes the same route during daily commuting, the user at the same time switches between different mobile networks. The disclosure's personalized, differential model considers such dynamic variation in network behavior on device, and a user's watching behavior pattern. The personalized model does the best adaptive bitrate selection, which makes sure uninterrupted, smooth video playback Referring to FIG. 13B concerning FIG. 13A, at operations S1302 and S1304, the process includes training of a base model based on training parameters including the network traces.

At operation S1306, the process includes pre-processing of collected data from a player 1301 such that the player 1301 may include an ABR protocol engine for AI based switching. Further, the player 1301 may perform media processing and rendering.

At operation S1308, the process includes creation of a differential learning based personalized model based on the base model and a pre-processed collecting data.

Figure 14A:
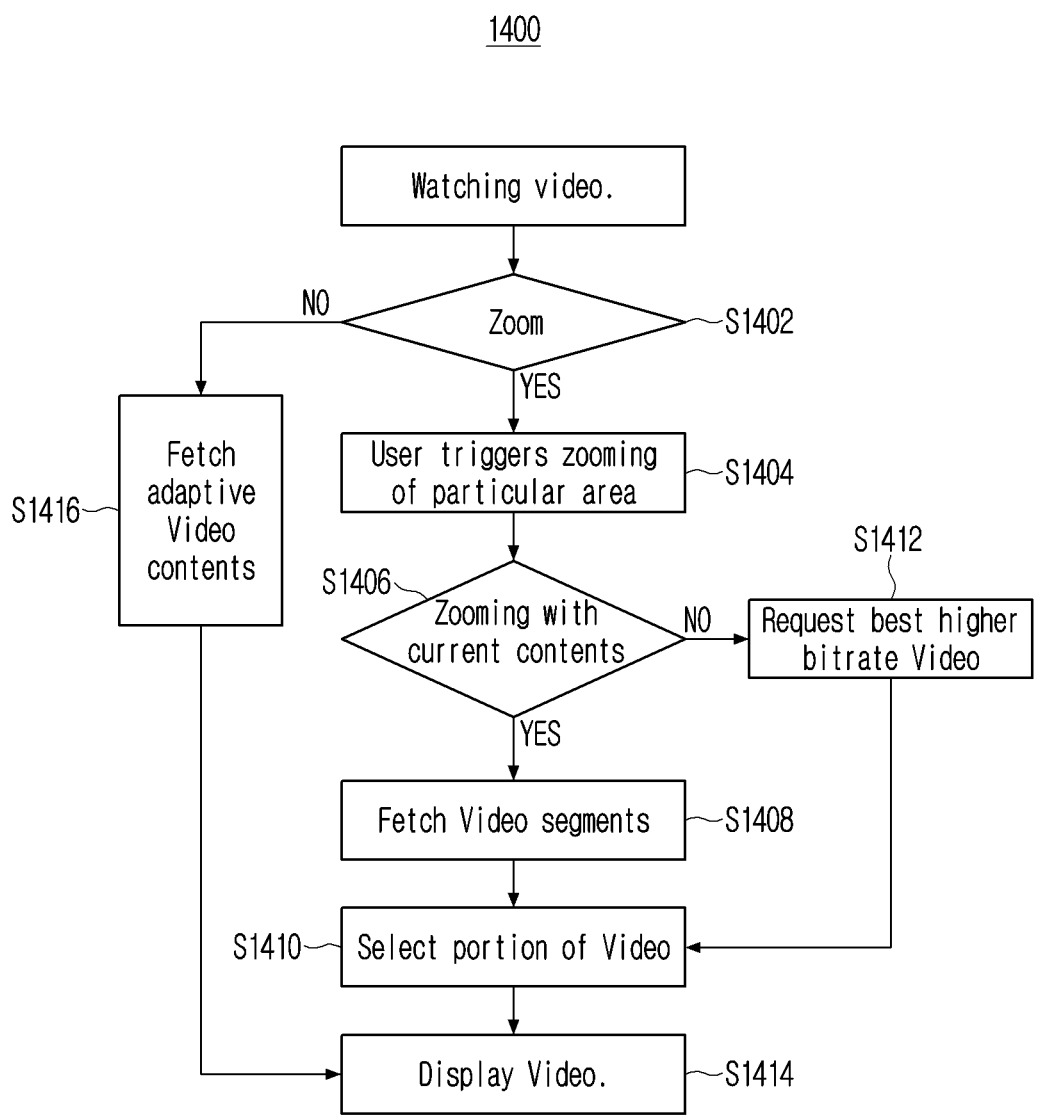
FIG. 14A illustrates a use case diagram for depicting a process for elected region zooming, according to an embodiment of the disclosure.
Figure 14B:
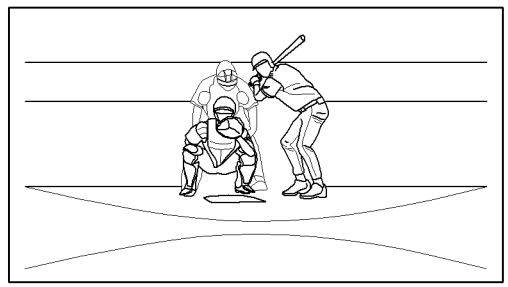
FIG. 14B illustrates a use case diagram for depicting a process for elected region zooming, according to an embodiment of the disclosure.
Figure 14C:
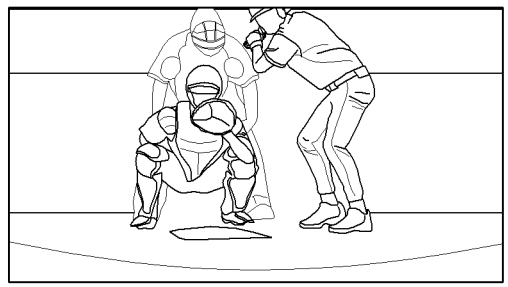
FIG. 14C illustrates a use case diagram for depicting a process for elected region zooming, according to an embodiment of the disclosure.

FIGS. 14A, 14B, and 14C illustrate a scenario for depicting a process for elected region zooming, according to various embodiments of the disclosure. Nowadays with different display sizes in different streaming playback product lines, e.g. TVs and mobiles, many a times user is interested in some specific area of the video, e.g. some text data, for example due to low video quality or smaller screen size. In such a scenario, the disclosure may be further appropriated such that a particular area of interest can be zoomed/shown with better quality for ultimate user satisfaction Referring to FIG. 14A, in a scenario 1400, at operation S1402, the process includes determining whether a video of FIG. 14B may be zoomed or not. In an embodiment, where it is determined that the video of FIG. 14B may be zoomed, the process may proceed towards operation S1404.

At operation S1404, the process includes triggering zooming of a particular area in the video by a user.

At operation S1406, the process includes determining whether the zooming may be performed with current contents. In an embodiment, where it is determined that the zooming may be performed, the process may move towards operation S1408.

At operation S1408, the process includes fetching video segments.

At operation S1410, the process includes selecting a portion of video.

In an embodiment, where it is determined that that the zooming may not be performed, the process may move towards S1412. At operation S1412, the process includes requesting best higher bitrate video and proceeding towards the operation S1410.

Further, at operation S1414, the process includes displaying the video based on the selected video portion at the operation S1410.

Further, in an embodiment, where it is determined that the video may not be zoomed, the process may move forward towards operation S1416. At operation S1416, the process includes fetching adaptive video components. Upon fetching the adaptive video components, the control proceeds towards the operation S1414 for displaying the video as depicted in FIG. 14C.

Figure 15:
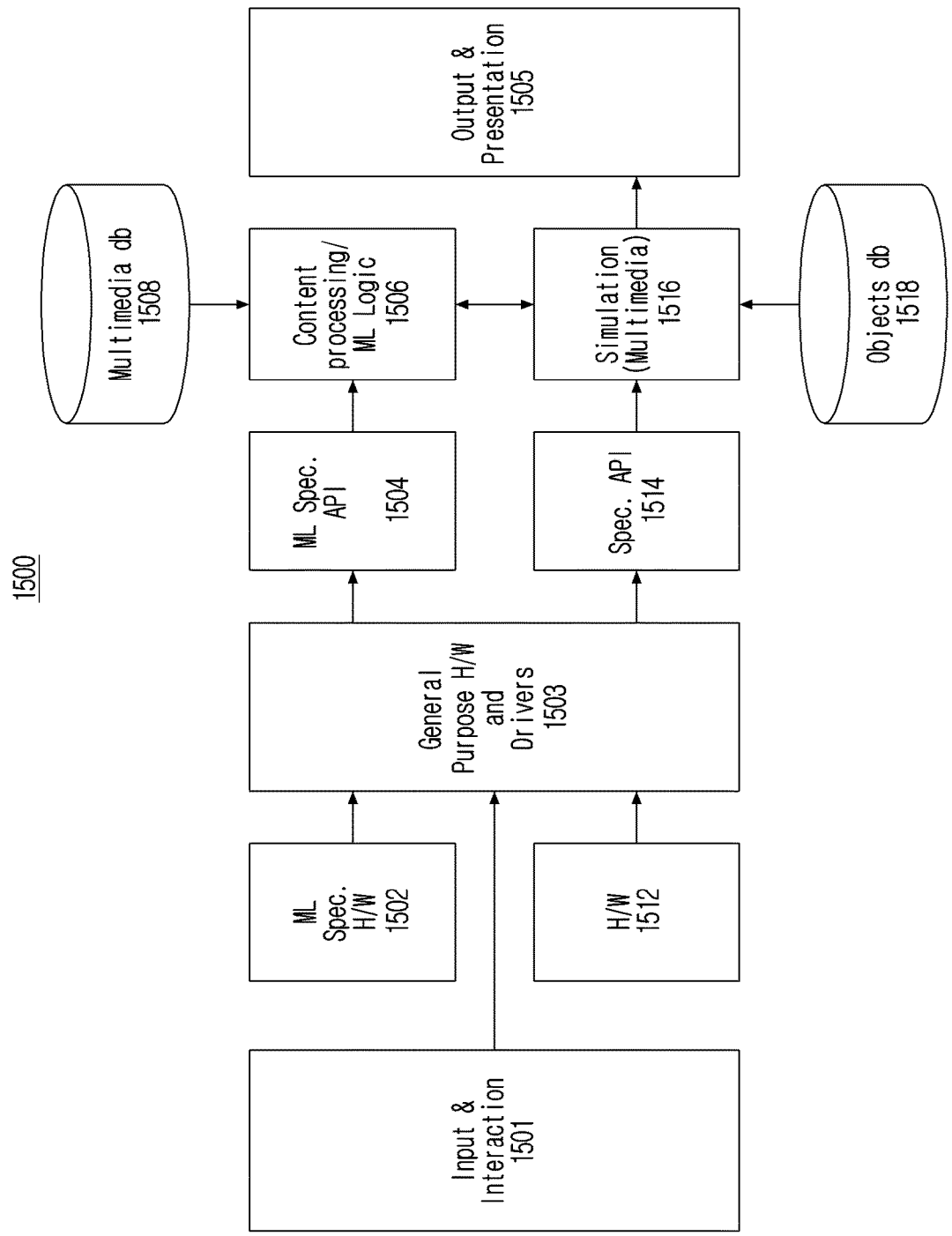
FIG. 15 illustrates a representative architecture to provide tools and development environment described herein for a technical-realization of the implementation in FIGS. 1B and 2 through an AI model based computing device according to an embodiment of the disclosure.

FIG. 15 illustrates a representative architecture to provide tools and development environment described herein for a technical-realization of the implementation in FIGS. 1B and 2 through an AI model based computing device according to an embodiment of the disclosure. FIG. 15 is merely a non-limiting example, and it will be appreciated that many other architectures may be implemented to facilitate the functionality described herein. The architecture may be executing on hardware such as a computing machine of FIG. 2 that includes, among other things, processors, memory, and various application-specific hardware components.

Referring to FIG. 15, an architecture 1500 may include an operating-system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as file-system (e.g., C standard library) that may provide functions such as memory allocation functions, string manipulation functions, mathematic functions, and the like. In addition, the libraries may include API libraries such as audio-visual media libraries (e.g., multimedia data libraries to support presentation and manipulation of various media format such as MPEG4, H.264, MP3, AAC, AMR, JPG, PNG), database libraries (e.g., SQLite that may provide various relational database functions), web libraries (e.g. WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Further, the architecture 1500 depicts an aggregation of computing device based mechanisms and ML/NLP based mechanism according to an embodiment of the disclosure. A user-interface defined as input and interaction 1501 refers to overall input. It can include one or more of the following— touch screen, microphone, camera etc. A first hardware module 1502 depicts specialized hardware for ML/NLP based mechanisms. In an example, the first hardware module 1502 comprises one or more of neural processors, FPGA, DSP, GPU etc.

A second hardware module 1512 depicts specialized hardware for executing the device-related audio and video simulations. ML/NLP based frameworks and APIs 1504 correspond to the hardware interface layer for executing the ML/NLP logic 1506 based on the underlying hardware. In an example, the frameworks may be one or more or the following—Tensorflow, Café, NLTK, GenSim, ARM Compute etc. Simulation frameworks and APIs 1514 may include one or more of—Device Core, Device Kit, Unity, Unreal etc.

A database 1508 depicts a pre-trained multimedia content database comprising the pre-formed clusters of multimedia content in the latent space. The database 1508 may be remotely accessible through cloud by the ML/NLP logic 1506. In other example, the database 1508 may partly reside on cloud and partly on-device based on usage statistics.

Another database 1518 refers the computing device DB that will be used to store multimedia content. The database 1518 may be remotely accessible through cloud by the Simulation (Multimedia) 1516. In other example, the database 1518 may partly reside on the cloud and partly on-device based on usage statistics.

A rendering module 1505 is provided for rendering multimedia output and trigger further utility operations as a result of user authentication. The rendering module 1505 may be manifested as a display cum touch screen, monitor, speaker, projection screen, etc.

A general-purpose hardware and driver module 1503 corresponds to the computing device 200 as referred in FIG. 2 and instantiates drivers for the general purpose hardware units as well as the application-specific units (i.e., the first hardware module 1502, and a second hardware module 1512).

In an example, the NLP/ML mechanism and simulations underlying the architecture 1500 may be remotely accessible and cloud-based, thereby being remotely accessible through a network connection. A computing device may be configured for remotely accessing the NLP/ML modules and simulation modules may comprise skeleton elements such as a microphone, a camera a screen/monitor, a speaker etc.

Further, at-least one of the plurality of modules of FIGS. 1A and 2 may be implemented through AI based on ML/NLP logic 1506. A function associated with AI may be performed through the non-volatile memory, the volatile memory, and the processor constituting the first hardware module 1502 i.e. specialized hardware for ML/NLP based mechanisms. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor of FIG. 2.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of a desired characteristic is made. The learning may be performed in a device (i.e. the architecture 1500 or the device of FIG. 2) itself in which AI according to an embodiment is performed, and/or may be implemented through a separate server/system.

The AI model may consist of a plurality of neural network layers. Each layer has a plurality of weight values, and performs a layer operation through calculation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic 1506 is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method in a networking environment to generate personalized data-streaming for a multimedia playback device, the method comprising:
   deploying an adaptive bit rate (ABR) based data-streaming logic as a base model at the multimedia playback device of a user;
   obtaining one or more parameters for a time duration based on a multimedia- playback at the multimedia playback device, the one or more parameters corresponding to a user-preference exhibited during the a multimedia playback;
   obtaining a statistical mean for the one or more parameters based on a first statistical analysis;
   identifying at least one parameter from the one or more parameters based on comparing the obtained mean against a predefined threshold weight associated with the one or more parameters in accordance with the base model;
   scaling the at least one identified parameter in a predefined format as training data for training the base model;
   applying a second statistical analysis to the at least one identified parameter of the multimedia playback device and another playback device for determining a covariance between both playback devices and determining a category of the playback device based on the covariance; and
   deploying a version of the trained base model to the playback device based on the category of the playback device.

2. The method of claim 1, wherein the obtaining of the statistical mean for the playback device based on the first statistical analysis of the one or more parameters comprises:
   receiving a plurality of values for the time duration with respect to a user-preference feature, the preference feature defining the one or more parameters; and outputting a regressed average value of the preference feature based on linear regression of the plurality of the values, the regressed average value corresponding to the obtained mean for a personalized feature (PF).

3. The method of claim 2, wherein the identifying the at least one parameter based on the obtained mean comprises:
comparing the regressed average value for the one or more parameters with the predefined threshold weight for the one or more parameters, the predefined threshold weight for the one or more parameters forming a part of metadata associated with an ABR model deployed at the playback device as the base model; and
selecting the at least one parameter based on a distance between the regressed average value and the predefined threshold weight corresponding to a predetermined range.

4. The method of claim 3, further comprising:
associating the at least one identified parameter associated with a plurality of real-number values, the real-number values corresponding to a randomized values set indicative of the preference of the user during the multimedia playback; and
creating training data for the base model by scaling the at least one identified parameter with the associated plurality of real-number values.

5. The method of claim 4, wherein the scaling comprises:
accessing metadata with respect to the deployed version of the trained base model at the playback device;
updating the metadata with one or more of:
the obtained mean for the at least one identified parameter, and
the real-number values accorded to the at least one identified parameter; and
associating the updated metadata with the base model for retraining the base model.

6. The method of claim 1, wherein the categorizing of the playback device based on the second statistical analysis comprises:
ascertaining similarity between the at least one identified parameter of the playback device and the other playback device;
based on the similarity being beyond a threshold, obtaining a covariance between both playback devices with respect the at least one identified parameter; and
categorizing both playback devices as similar based on observing the obtained covariance between both playback devices as positive with respect to a predefined number of the at least one identified parameter.

7. The method of claim 4, wherein obtaining the covariance between both playback devices with respect to each of the at least one identified parameter comprises:
fetching, with respect to both of the playback devices, the real number values with respect to the at least one identified parameter;
with respect to the at least one identified parameter, obtaining a net value by subtracting the real number value from a corresponding mean of the real number values
multiplying the obtained net values for both playback devices to obtain a product; and
determining a positive covariance with respect to the at least one identified parameter based on a positive sign of the product.

8. The method of claim 1, further comprising:
obtaining device capabilities based on a plurality of parameters defined as one or more of:
availability of support for a neural network based processing unit (NPU),
historical usage of the NPU,
storage availability, or
power-utilization;
sensing a configuration of the playback device based on obtaining the device capability through the plurality of parameters;
based on the sensing, outputting a regressed average value of the plurality of parameters based on linear regression of the plurality of the parameters;
comparing the regressed average value for the plurality of parameters with the predefined threshold weight for the plurality of parameters, the predefined threshold weight for the plurality of parameters forming a part of metadata associated with an ABR model deployed at the playback device as the base model;
identifying one or more parameters out of the plurality of parameters related to the capabilities of the playback device based on a distance between the regressed average value and the predefined threshold weight corresponding to a predetermined range;
associating the one or more identified parameters associated with a plurality of real-number values, the real-number values corresponding to a randomized values set indicative of the capabilities of the playback device during the multimedia playback;
creating a device-capability based training data for the base model by scaling the one or more identified parameters with the associated plurality of real-number values; and
training the base model along based on the device-capability based training data and thereby deploying the trained base model on the category of the playback device.

9. The method of claim 1, wherein the deployment of the ABR model as the base model at the playback device comprises:
simulating content-playback based on network traces and at least one standard ABR logic;
logging a plurality of states associated with the simulated content-playback;
generating the base model based on training through a reinforcement machine learning (ML) based criteria using the plurality of states, the reinforcement ML based criteria directed to a bitrate selection for maximizing quality of experience (QoE) as reward; and
deploying the base model to multimedia playback devices along with version and meta-data.

10. The method of claim 1, wherein the one or more parameters correspond to a video bitrate, a video resolution, buffer sizes, a watching-behavior of a user, a genre, a frame per second (fps), a buffer, and a resolution.

11. The method of claim 9, wherein the states correspond to the training data for generating the base model through the reinforcement ML based criteria and are defined as one or more of:
a buffer size,
a time taken to download a past chunk of media,
a throughput associated with the past chunk of media,
a bitrate associated with the past chunk of media,
an incoming chunk size, or
a remaining number of chunks for download.

12. The method of claim 9, further comprising selecting the network traces from synthetic data, open network and historical data, the network traces comprising one or more of:

a type of network used during simulated playback,
a duration of a media segment,
a start time of the simulated content-playback, or
an end time of the simulated content-playback.

13. A system for generating personalized data-streaming at a multimedia playback device, the system comprising:
   an adaptive bit rate (ABR) based data-streaming logic deployed as a base model;
   a learning module comprising:
      a differential mean processor for:
         obtaining one or more parameters for a time duration based on a multimedia-playback at the multimedia playback device, the one or more parameters corresponding to a user-preference exhibited during a multimedia playback, and
         obtaining a statistical mean for the one or more parameter based on a first statistical analysis;
      a personalized feature selection module for identifying at least one parameter based on comparing the obtained mean against a predefined threshold weight associated with the one or more parameters in accordance with the base model;
      a metadata mapping module for scaling the at least one identified parameter in a predefined format as training data for training the base model; and
      a device categorizer for:
         applying a second statistical analysis to the at least one identified parameter of the multimedia playback device and another playback device for determining a covariance between both playback devices and determining a category of the playback device based on the covariance, and
         deploying a version of the trained base model upon the playback device based on the category of the playback device.

14. The system of claim 13, wherein the differential mean processor for obtaining of the statistical mean for the playback device based on the first statistical analysis of the parameters is configured for:
   receiving a plurality of values for the time duration with respect to a user-preference feature, the preference feature defining the one or more parameters; and
   outputting a regressed average value of the preference feature based on linear regression of the plurality of the values, the regressed average value corresponding to the obtained mean for the preference feature.

15. The system of claim 14, wherein the personalized feature selection module for identifying the at least one parameter based on the obtained mean is configured for:
   comparing the regressed average value for the one or more parameters with the predefined threshold weight for the one or more parameters, the predefined threshold weight for the one or more parameters forming a part of metadata associated with an ABR model deployed at the playback device as the base model; and
   selecting the at least one parameter based on a distance between the regressed average value and the predefined threshold weight corresponding to a predetermined range.

16. The system of claim 15, further comprising a preference feature value matrix generator configured for associating the at least one identified parameter associated with a plurality of real-number values, the real-number values corresponding to a randomized values set indicative of the preference of the user during the multimedia playback,
   wherein a metadata mapper module is configured for creating training data for the base model by scaling the at least one identified parameter with the associated plurality of real-number values.

17. The system of claim 16, wherein the metadata mapper module for scaling is configured to:
   accessing metadata with respect to the deployed base model at the playback device;
   updating the metadata with one or more of:
      the obtained mean for the at least one identified parameter, or
      the real-number values accorded to the at least one identified parameter; and
   associating the updated metadata with the base model for retraining the base model.

18. The system of claim 13, wherein the device categorizer for categorizing the device based on the second statistical analysis is configured for:
   ascertaining similarity between the at least one identified parameter of the playback device and another playback device;
   based on the similarity being beyond a threshold, obtaining a covariance between both playback devices with respect the at least one identified parameter; and
   categorizing both playback devices as similar based on observing the obtained covariance between both playback devices as positive with respect to a predefined number of the at least one identified parameter.

19. The system of claim 16, wherein the device categorizer for obtaining the covariance between both playback devices with respect to each of the identified parameter is configured for:
   fetching, with respect to both of the playback devices, the real number values with respect to the at least one identified parameter;
   with respect to the at least one identified parameter, obtaining a net value by subtracting the real number value from a corresponding mean of the real number values
   multiplying the obtained net values for both playback devices to obtain a product; and
   determining a positive covariance with respect to the at least one identified parameter based on a positive sign of the product.

20. The system of claim 13, further comprising a device capability obtaining module for:
   obtaining device capabilities based on a plurality of parameters defined as one or more of:
      availability of support for a neural network based processing unit (NPU),
      historical usage of the NPU,
      storage availability, or
      power-utilization;
   sensing a configuration of the playback device based on obtaining the device capability through the plurality of parameters;
   based on the sensing, outputting a regressed-average value of the plurality of parameters based on linear regression of the plurality of the parameters;
   comparing the regressed average value for the plurality of parameters with the predefined threshold weight for the plurality of parameters, the predefined threshold weight for the plurality of parameters forming a part of metadata associated with an ABR model deployed at the playback device as the base model;
   identifying one or more parameters out of the plurality of parameters related to the capabilities of the playback device based on a distance between the regressed average value and the predefined threshold weight corresponding to a predetermined range;

associating the one or more identified parameters associated with a plurality of real-number values, the real-number values corresponding to a randomized values set indicative of the capabilities of the playback device during the multimedia playback;

creating a device-capability based training data for the base model by scaling the one or more identified parameters with the associated plurality of real-number values; and enabling the training of the base model along based on the device-capability based training data for deploying the trained base model on the category of the playback device.

21. The system of claim 13, further comprising a network node for deployment of an ABR model as the base model at the playback device, the network node configured for:

simulating content-playback based on network traces and at-least one standard ABR logic;

logging a plurality of states associated with the simulated content playback;

generating the base model based on training through a reinforcement machine learning (ML) based criteria using the plurality of states, the reinforcement ML based criteria directed to a bitrate selection for maximizing quality of experience (QoE) as reward; and deploying the base model to multimedia playback devices along with version and meta-data.

22. The system of claim 13, wherein the one or more parameters correspond to a video bitrate, a video resolution, buffer sizes, a watching-behavior of a user, a genre, a frame per second (fps), a buffer, and a resolution.

23. The system of claim 21, wherein the states correspond to the training data for generating the base model through the reinforcement ML based criteria and are defined as one or more of:

a buffer size, a time taken to download a past chunk of media, a throughput associated with the past chunk of media, a bitrate associated with the past chunk of media, an incoming chunk size, or a remaining number of chunks for download.

24. The system of claim 21, wherein the network node is configured for selecting the network traces from synthetic data, open network and historical data, the network traces comprising one or more of:

a type of network used during simulated playback, a duration of a media segment, a start time of the simulated content-playback, or an end time of the simulated content-playback.

25. The system of claim 13, wherein the covariance is calculated by considering a value associated with each of one or more parameters related to both playback devices.

26. The system of claim 13, wherein the at least one identified parameter of the playback device includes a processor type of the playback device.

27. The system of claim 26, wherein the processor type is one of a central processing unit (CPU), an application processor (AP), a graphics processing unit (GPU), a visual processing unit (VPU), or a neural processing unit (NPU).

* * * * *